(12) United States Patent
Brandt et al.

(10) Patent No.: US 8,559,393 B2
(45) Date of Patent: Oct. 15, 2013

(54) INDICATING ACTION TIMES AND FAST RANGING CAPABILITIES OF TARGET BASE STATIONS

(75) Inventors: Achim Von Brandt, München (DE); Yi Zhang, Beijing (CN); Shun Liang Zhang, Beijing (CN); Wei Hua Zhou, Beijing (CN)

(73) Assignee: Nokia Siemens Networks Oy, Espoo (FI)

( * ) Notice: Subject to any disclaimer, the term of this patent is extended or adjusted under 35 U.S.C. 154(b) by 0 days.

(21) Appl. No.: 12/936,115

(22) PCT Filed: Apr. 3, 2009

(86) PCT No.: PCT/IB2009/005681
§ 371 (c)(1),
(2), (4) Date: Oct. 14, 2011

(87) PCT Pub. No.: WO2009/122304
PCT Pub. Date: Oct. 8, 2009

(65) Prior Publication Data
US 2012/0087338 A1 Apr. 12, 2012

Related U.S. Application Data

(63) Continuation-in-part of application No. 12/098,156, filed on Apr. 4, 2008.

(60) Provisional application No. 61/114,460, filed on Nov. 13, 2008, provisional application No. 61/118,564, filed on Nov. 28, 2008.

(51) Int. Cl.
*H04W 4/00* (2009.01)
*H04W 36/00* (2009.01)

(52) U.S. Cl.
USPC ............ 370/331; 455/437; 455/438; 455/442

(58) Field of Classification Search
USPC ................. 370/331; 455/436–438, 440–443
See application file for complete search history.

(56) References Cited

U.S. PATENT DOCUMENTS

2005/0059437 A1* 3/2005 Son et al. ............... 455/574
2005/0101328 A1   5/2005 Son et al.
(Continued)

FOREIGN PATENT DOCUMENTS

CN   1930903 A   3/2007
CN   1965505 A   5/2007
(Continued)

OTHER PUBLICATIONS

"Part 11: Wireless LAN Medium Access Control (MAC) and Physical Layer (PHY) Specifications", IEEE, IEEE Standard for Information Technology—Telecommunications and information exchange between systems—Local and metropolitan area networks—Specific requirements, IEEE Computer Society, IEEE Std. 802.11—2007, Jun. 12, 2007, 1232 pages.

(Continued)

*Primary Examiner* — Ronald Abelson
(74) *Attorney, Agent, or Firm* — Brake Hughes Bellermann LLP

(57) ABSTRACT

According to one example embodiment, a method may include determining whether each of a plurality of target base stations is capable of providing a fast ranging opportunity to a mobile station served by the serving base station, and, for each of the plurality of target base stations which is capable of providing the fast ranging opportunity to the mobile station, determining an action time after which the target base station can send an uplink map to the mobile station, the uplink map indicating when the mobile station should send a fast ranging request. The method may also include sending a handover message to the mobile station, the handover message indicating whether each of the plurality of target base stations is capable of providing the fast ranging opportunity to the mobile station and, for each of the plurality of target base stations which is capable of providing the fast ranging opportunity to the mobile station, indicating the action time after which the target base station can send the uplink map to the mobile station.

21 Claims, 17 Drawing Sheets

(56) References Cited

U.S. PATENT DOCUMENTS

| | | |
|---|---|---|
| 2007/0149198 A1 | 6/2007 | Park et al. |
| 2007/0191009 A1 | 8/2007 | Hong et al. |
| 2007/0258407 A1 | 11/2007 | Li et al. |
| 2008/0109693 A1* | 5/2008 | Maas et al. .................. 714/748 |
| 2009/0131056 A1* | 5/2009 | Bontu et al. ................. 455/436 |
| 2012/0087338 A1 | 4/2012 | Brandt et al. |

FOREIGN PATENT DOCUMENTS

| | | |
|---|---|---|
| KR | 10-2008-0042527 A | 5/2008 |
| RU | 2237363 C2 | 9/2004 |
| RU | 2295843 C2 | 3/2007 |
| RU | 2305902 C2 | 9/2007 |
| WO | 2006/131067 A1 | 12/2006 |
| WO | 2009/122304 A2 | 10/2009 |
| WO | 2009/122304 A3 | 10/2009 |

OTHER PUBLICATIONS

Li, Ting, et al., "Proposal for Fast Ranging Support Considering Non-Transparent RSs in Distributed Scheduling Mode", IEEE 802.16 Broadband Wireless Access Working Group, IEEE C802.16j-08/070, Mar. 14, 2008, pp. 1-4.

Bontu, Chandra, U.S. Appl. No. 60/989,541, titled "WIMAX Handover", filed Nov. 21, 2007, 28 pages.

International Preliminary Report on Patentability received for International Patent Application No. PCT/IB2009/005681, mailed on Oct. 14, 2010, 14 pages.

"Part 16: Air Interface for Broadband Wireless Access Systems", DRAFT Standard for Local and metropolitan area networks, LAN/MAN Standards Committee of the IEEE Computer Society, IEEE Microwave Theory and Techniques Society, P802.16Rev2/D3, Feb. 20, 2008, pp. i and 213-235.

International Search Report and Written Opinion for International Application Serial No. PCT/IB2009/005681, mailed on Mar. 22, 2010, 21 pages.

Chen, et al., "A Cross-Layer Fast Handover Scheme for Mobile WiMAX", IEEE 66TH Vehicular Technology Conference, VTC-2007, Sep. 1, 2007, pp. 1578-1582.

Sik Choi et al: "Fast Handover Scheme for Real-Time Downlink Services in IEEE 802.16e BWA System", IEEE 61st Vehicular Technology Conference, VTC 2005-Spring, vol. 3, 5 pages.

IEEE Std 802.16e—2005 802.16/2004/Cor1-2005 (Amendment and Corrigendum to IEEE Std 802.16-2004) IEEE Standard for Local and Metropolitan Area Networks, Part 16: Air interface for Fixed and Mobile Broadband Wireless Access Systems, Amendment 2: Physical and Medium Access Control Layers for Combined Fixed and Mobile Operation in Licensed Bands and Corrigendum 1, 864 pages.

IEEE 802.16-2004 (Revision of IEEE Std 802.16-2001) "IEEE Standard for Local and metropolitan area networks; Part 16: Air Interface for Fixed and Mobile Broadband Wireless Access Systems"; IEEE Computer Society and the IEEE Microwave Theory and techniques Society; Sponsored by the LAN/MAN Standards Committee; IEEE, 3 Park Avenue, New York, NY 10016-5997, USA, Oct. 1, 2004, 893 pages.

* cited by examiner

INDICATING ACTION TIMES AND FAST RANGING CAPABILITIES OF TARGET BASE STATIONS

PRIORITY CLAIM

This application is a national stage entry of PCT/IB2009/005681, filed on Apr. 3, 2009, entitled "Action Times for Handover of Mobile Stations", which, in turn, claims the benefit of priority based on U.S. patent application Ser. No. 12/098,156, filed on Apr. 4, 2008, entitled, "Multiple Action Times in Mobile WiMAX Fast HO," and U.S. Provisional Application No. 61/114,460, filed on Nov. 13, 2008, entitled, "Indicating Action Times and Fast Ranging Capabilities of Target Based Stations," and U.S. Provisional Application No. 61/118,564, filed on Nov. 28, 2008, entitled, "Action Times for Handover of Mobile Stations," the disclosures of all of which are hereby incorporated by reference.

TECHNICAL FIELD

This description relates to wireless networks.

BACKGROUND

In wireless networks, mobile stations may stop receiving service from a serving base station and begin receiving service from a target base station by handing over from the serving base station to the target base station.

SUMMARY

The details of one or more implementations are set forth in the accompanying drawings and the description below. Other features will be apparent from the description and drawings, and from the claims.

DETAILED DESCRIPTION

Figure 1:
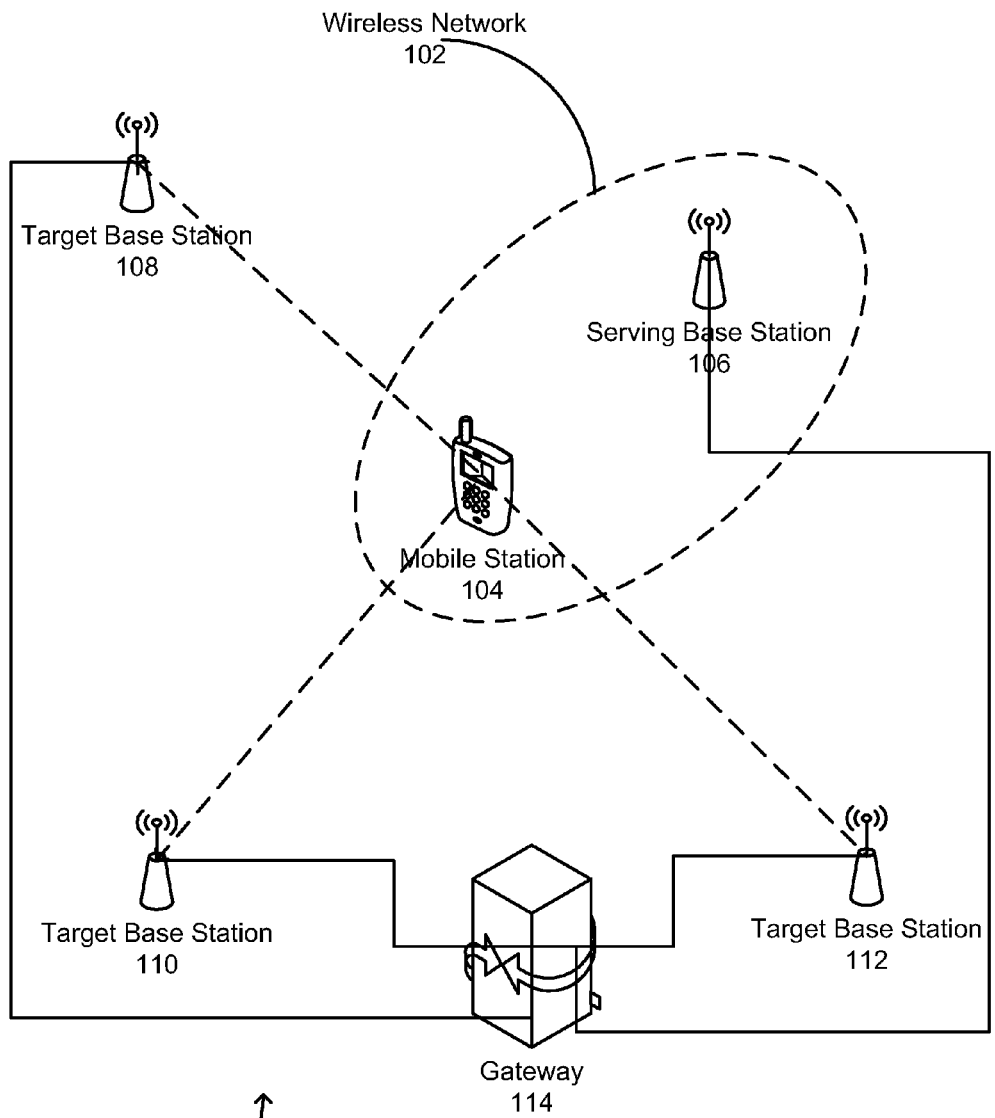
FIG. 1 shows a network according to an example embodiment.

FIG. 1 shows a network 100 according to an example embodiment. The network 100 may include, for example, an IEEE 802.16 Worldwide Interoperability for Microwave Access (WiMAX) network, a Third Generation Partnership Project (3GPP) Long Term Evolution (LTE) network, an IEEE 802.11 Wireless Local Area Network (WLAN), or a cellular telephone network, according to example embodiments. The network 100 may provide wireless data service to users or subscribers who enter the network 100.

The network 100 may include one or more wireless networks 102. Each wireless network 102 may provide wireless data service to one or more mobile stations 104. While only one mobile station 104 is shown in FIG. 1, any number of mobile stations 104 may be included in the wireless network 102.

The wireless network 102 may include a serving base station 106. The serving base station 106 may provide wireless (or unguided) data and/or voice service to the mobile station 104 via an air interface. The serving base station 106 may, for example, send data to the mobile station 104 in a downlink (DL) direction, and may receive data from the mobile station 104 in an uplink (UL) direction. The serving base station 106 may include a base station, relay station, node B, or access point, according to example embodiments. The serving base station 106 may be connected or coupled to the network 100 via a wired or guided connection.

The network 100 may also include a plurality of target base stations 108, 110, 112. While three target base stations 108, 110, 112 are shown in FIG. 1, any number of target base stations 108, 110, 112 may be included in the network 100. The target base stations 108, 110, 112 may include base stations, relay stations, node Bs, or access points, according to example embodiments. The target base stations 108, 110, 112 may be connected or coupled to the network 100 via wired or guided connections. The target base stations 108, 110, 112 may each serve their own respective wireless networks, and may provide wireless data service to mobile stations (not shown) within their respective wireless networks. As the mobile station 104 roams throughout the network 100, the mobile station 104 may handover from the serving base station 106 to one of the target base stations 108, 110, 112.

The network 100 may also include a gateway 114. The gateway 114 may include, for example, an access service node (ASN) gateway. The gateway 114 may be connected or coupled to each of the serving base station 106 and the target base stations 108, 110, 112 via wired or guided connections.

The gateway 114 may also be connected to the Internet, and may provide the serving base station 106 and target base stations 108, 110, 112 with access to the Internet; the serving base station 106 and target base stations 108, 110, 112 may provide the mobile stations 104 within their respective wireless networks 102 with access to the Internet, according to an example embodiment.

The mobile station 104 may provide data service to a user or subscriber by wirelessly (or without a guided medium) communicating with the serving base station 106 via the air interface. The mobile station 104 may include a cellular telephone, personal digital assistant (PDAs), smartphone, laptop or notebook computer, or other portable devices capable of processing data, receiving input from and providing output to a user, and communicating with the serving base station 106 via the air interface. The mobile station 104 may send data to the serving base station 106 in the uplink (UL) direction, and may receive data from the serving base station 106 in the downlink direction.

As a user of the mobile station 104 travels throughout the network 100, determinations may be made, such as by the gateway 114, the serving base station 106, and/or the mobile station 104, to hand the mobile station 104 over to one of the target base stations 108, 110, 112. The mobile station 104 and/or serving base station 106 may, for example, monitor a channel or signal quality of communication between the mobile station 104 and serving base station 106, such as by measuring and/or determining the channel-to-interference-and-noise ratio (CINR), signal-to-interference-and-noise ratio (SINR) and/or signal-to-noise ratio (SNR) of communication in the uplink and/or downlink direction between the mobile station 104 and serving base station 106. The mobile station 104 may also monitor a channel or signal quality of communication with the target base stations 108, 110, 112. The mobile station 104 may monitor the channel or signal quality of communication with the target base stations 108, 110, 112 based, for example, on pilot signals received from each of the target base stations 108, 110, 112. The mobile station 104 may monitor the channel or signal quality of communication with the target base stations 108, 110, 112 periodically, or based on the channel or signal quality of communication with the serving base station 106 dropping below a threshold level, according to example embodiments. In an example embodiment, the mobile station 104 may send the channel quality of communication with the target base stations 108, 110, 112 to the serving base station 106.

The mobile station 104 and/or serving base station 106 may compare the channel or signal quality of communication between the mobile station 104 and the serving base station 106 with the channel or signal quality of communication between the mobile station 104 and the target base stations 106, 108, 110. Based on the comparison, either the mobile station 104 or the serving base station 106 may initiate a handover.

Without an example embodiment disclosed herein, a target base station 108, 110, 112 would only set one "Action Time" (at this time (Action Time) the mobile station 104 is offered by a base station to perform a fast hand over without contention) which resulted in more fast HO (handover) failures (if the "Action Time" time limit is too short, i.e. if this time comes to soon after being announced) or in longer handover delays (if "Action Time" time is too long).

According to an example embodiment, more than one "Action Time" may be set for a mobile station 104 for at least one target base station 108, 110, 112 or for each target base station 108, 110, 112 the mobile station 104 could move to.

According to an embodiment of the invention, one or more action times can be used for each target base station 108, 110, 112. These multiple action time values may be signalled from a target base station 108, 110, 112 to a serving base station 106 in a R6/R4 HO_Rsp signal (TBD in NWG Rel1 Ver 1.2). Signalling of these multiple action time values from the serving base station 106 to a mobile station 104 can be done across a R1 interface in, e.g. a MOB_BSHO-RSP message or in a MOB_BSHO-REQ (TBD in 802.16e-Rev2) message for mobile-triggered or network-triggered handover respectively. A target base station 108, 110, 112 may stop the broadcast of fast ranging opportunities for a particular mobile station 104 if that mobile station 104 has succeeded in using one opportunity. A target base station 108, 110, 112 may stop the broadcast of fast ranging opportunities for a particular mobile station 104 if that mobile station 104 has reverted to a conventional contention-based ranging for hand-over process.

According to example embodiments, action times may be signalled either as a list of discrete action times, as a list of pairs (T-BS ID, Action Time) where the same T-BS ID may show up in more than one pair, as a list of bursts, each being denoted by the start instant and number of instances, or as a list of bursts each being denoted by the start of burst, end of burst and the frequency of action times. The broadcast of fast ranging opportunities may follow standardized formula (in 802.16e-Rev2), e.g., exponentially-growing inter-Action Time spacing, etc. and the size.

Figure 2A:
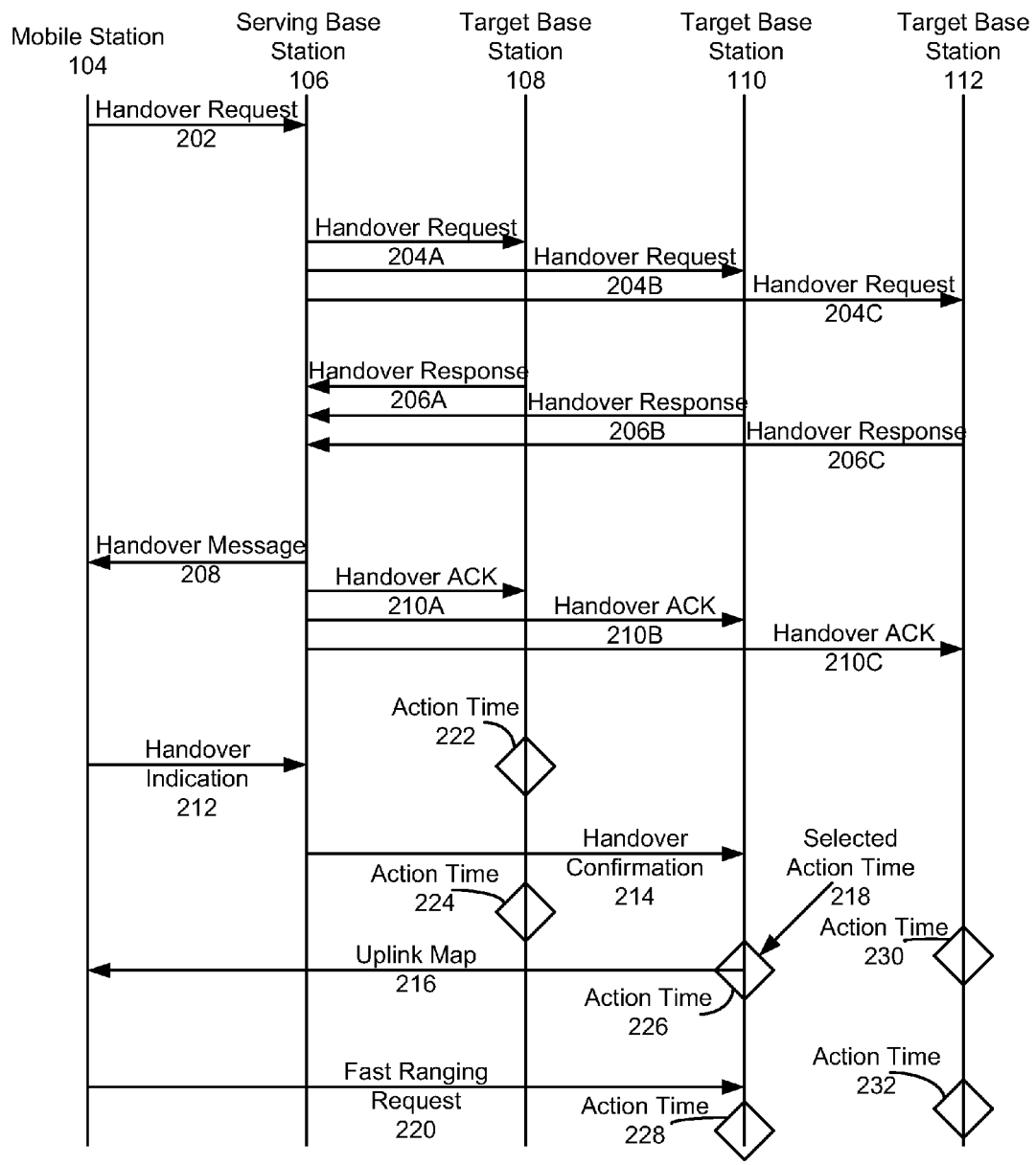
FIG. 2A is a vertical time-sequence diagram showing messages exchanged during a handover process initiated by a mobile station according to an example embodiment.

FIG. 2A is a vertical time-sequence diagram showing messages exchanged during a handover process initiated by the mobile station 104 according to an example embodiment. The mobile station 104 may be receiving service from the serving base station 106, and the mobile station 104 may be in wireless communication with the serving base station 106. The serving base station 106 may have determined, during the registration process, whether the mobile station 104 can support and/or process a handover message 208 (described below) which includes more than one action time and/or includes action time fields with a value of zero. This determination may have been made during a capability negotiation process described with reference to FIG. 4. In this example, the mobile station 104 may determine to initiate a handover. The mobile station 104 may determine to initiate the handover based on comparing the channel or signal quality between the mobile station 104 and the serving base station 106 with the channel or signal quality between the mobile station 104 and the serving base stations 108, 110, 112. The mobile station 104 may determine to initiate the handover based, for example, on determining that the channel or signal quality between the mobile station 104 and the serving base station 106 has fallen below a predetermined threshold, based on determining that the channel or signal quality between the mobile station 104 and one or more of the serving base stations 108, 110, 112 exceeds the channel or signal quality between the mobile station 104 and the serving mobile station 106, or based on determining that the channel or signal quality between the mobile station 104 and one or more of the serving base stations 108, 110, 112 exceeds the channel or signal quality between the mobile station 104 and the serving mobile station 106 by a predetermined threshold, according to example embodiments. The mobile station 104 may also determine which target base stations 108, 110, 112 the mobile station 104 is interested in handing over to based, for example, on the channel or signal quality between the mobile station 104 and the target base station(s) 108, 110, 112 exceeding a predetermined minimum value, according to an example embodiment.

Based on determining to initiate the handover, the mobile station 104 may send a handover request message 202 to the serving base station 106. The handover request message 202 may, for example, indicate which target base station(s) 108, 110, 112 the mobile station 104 is interested in handing over to.

In response to receiving the handover request message 202 from the mobile station 104, the serving base station 106 may send backhaul network handover request messages 204A, 204B, 204C to each of the target base stations 108, 110, 112 that were indicated by the mobile station 104 in the handover request message 202. The serving base station 106 may send the backhaul network handover request messages 204A, 204B, 204C to the target base stations 108, 110, 112 via the backhaul network, such as via the wired or guided connections in the network 100, and/or via the gateway 114. In an example in which the network 100 includes relay stations, any or all of the backhaul network handover request messages 204A, 204B, 204C may be sent wirelessly via an air interface for one or more of their respective hops. The backhaul network handover request messages 204A, 204B, 204C may identify themselves as such, may identify the mobile station 104 to be handed over, may identify the location of the mobile station 104 to be handed over, may indicate the channel or signal quality of the mobile station 104 with the target base station 108, 110, 112 to which the backhaul network handover request message 204A, 204B, 204C is sent, may indicate whether the mobile station 104 supports multiple action times, and/or may include other information about the mobile station 104 to be handed over, according to example embodiments.

In an example embodiment, the handover request messages 204A, 204B, 204C may include the following fields or information elements:

| IE | M/O | Notes |
| --- | --- | --- |
| HO Type | M | |
| Registration Type | O | Included when Data Path Pre-reg is piggybacked. |
| MS Info | M | |
| >NSP ID | O | NSP identifier. Used to help distinguish the R4 and R6 tunnels for a specific NSP. |
| >Anchor ASN GW ID | O | Identifies the node that hosts the Anchor DP Function in the Anchor ASN. Included if the originator of HO_Req does not host the Anchor DP Function for the MS. |
| >Authenticator ID | O | Identifies the node that hosts Authenticator and Key Distributor Function. Included if the security context is not included in the message; included if the originator of the HO_Req does not host the Authenticator and Key Distributor Function for the MS. |
| >Anchor MM Context | O | The TLV MAY be included in order to optimize FA Relocation to the Target ASN after HO. If included, notifies the Target ASN that FA relocation to the Target ASN will be initiated after HO. The Target ASN MAY use it to decide whether or not to accept the HO. |
| >SBC Context | O[1] | 802.16e related MS session context. |
| >REG Context | O[1] | 802.16e related MS session context. |
| >>Additional action time support | | MS's capability of supporting additional action time |
| >SA Descriptor | O[1] | May be included by Serving ASN for the Target ASN. |
| >SF Info (one or more) | M | |
| BS Info (Serving) | M | |
| BS Info (Target, one or more) | M | Relative Delay, DL/UL PHY Quality Info as viewed by MS. |

In response to receiving the backhaul network handover request messages 204A, 204B, 204C, the respective target base stations 108, 110, 112 may determine whether they can provide a fast ranging opportunity for the mobile station 104 to send a fast ranging request upon entry into their respective wireless networks, or whether the mobile station 104 will have to make a contention-based request. The target base stations 108, 110, 112 may determine whether they can provide the fast ranging opportunity to the mobile station 104 based at least in part, for example, on the information included in the backhaul network handover request messages 204A, 204B, 204C, and/or based on information such as the number of mobile stations already served by the target base station 108, 110, 112 and/or the volume of data traffic served by the target base station 108, 110, 112.

If the target base stations 108, 110, 112 determine that they can provide the fast ranging opportunity to the mobile station 104, then an action time 222, 224, 226, 228, 230, 232 may be determined. The action time 222, 224, 226, 228, 230, 232 may be determined by the respective target base stations 108, 110, 112, by the serving base station 106, or by the gateway 114, according to example embodiments. The action time 222, 224, 226, 228, 230, 232 may be a time after which the target base station 108, 110, 112 may send an uplink map to the mobile station 104. The action time 222, 224, 226, 228, 230, 232 may, for example, be a time when the target base station 108, 110, 112 may dedicate a time slot to send an uplink map to the mobile station 104. The uplink map may indicate when the mobile station 104 may send a ranging request to one or more of the target base station 108, 110, 112 in response to the fast ranging opportunities, so that the mobile station 104 does not need to engage in contention-based ranging.

In an example embodiment, the action time 222, 224, 226, 228, 230, 232 may be the number of frames until the target base station 108, 110, 112 will allocate a dedicated transmission opportunity for the mobile station 104 to transmit a ranging request message using a fast ranging information element. The dedicated transmission opportunity may allow the mobile station 104 to transmit the ranging request with channel parameters that were provided to the mobile station 104 for the target base station 108, 110, 112 before the handover, and which stay valid and can be reused during network re-entry by the mobile station 104 into the wireless network served by the target base station without CDMA-based ranging. The serving base station 106 may determine a final action time 222, 224, 226, 228, 230, 232 based on information obtained by the serving base station 106 from the target base stations 108, 110, 112 over the backbone network 100.

While two action times 222, 224, 226, 228, 230, 232 are shown for each target base station 108, 110, 112 in FIG. 2A, each target base station 108, 110, 112 may have any number of available action times 222, 224, 226, 228, 230, 232, according to various example embodiments. In one example embodiment, each target base station 108, 110, 112 may have only one available action time 222, 224, 226, 228, 230, 232 (or none if no action time 222, 224, 226, 228, 230, 232 is available for that target base station 108, 110, 112). In an example embodiment, one or more of the target base stations 108, 110, 112 may have more than one action time 222, 224, 226, 228, 230, 232 during which the respective target base station 108, 110, 112 may allocate the dedicated transmission opportunity for the mobile station 104. For example, each of the target base stations 108, 110, 112 may have determined that it has two or more action times 222, 224, 226, 228, 230, 232 during which it may allocate the dedicated transmission opportunity to the mobile station 104.

The target base stations 108, 110, 112 may each send backhaul network handover response messages 206A, 206B, 206C to the serving base station 106. The backhaul network handover response messages 206A, 206B, 206C may be based on the determination of whether the target base station 108, 110, 112 can provide the fast ranging opportunity to the mobile station 104, and may be based on the determination of the action time. The backhaul network handover response messages 206A, 206B, 206C may, for example, indicate whether the respective target base station 108, 110, 112 can provide the fast ranging opportunity to the mobile station 104, and may indicate the action time. In an example embodiment, one or more of the backhaul network handover response messages 206A, 206B, 206C may indicate more than one action time after which the respective target base station 108, 110, 112 can send the uplink map to the mobile station 104. One or more, or all, of the backhaul network handover response messages 206A, 206B, 206C may indicate whether the sending target base station 108, 110, 112 supports multiple action times.

In an example in which one or more of the target base stations 108, 110, 112 may have two or more available action times 222, 224, 226, 228, 230, 232, one or more of the backhaul network handover response messages 206A, 206B, 206C may include at least two action times 222, 224, 226, 228, 230, 232. In an example in which each of the target base stations 108, 110, 112 may have two or more available action times 222, 224, 226, 228, 230, 232, each of the backhaul network handover response messages 206A, 206B, 206C may include at least two action times 222, 224, 226, 228, 230, 232. While two action times 222, 224, 226, 228, 230, 232 have been discussed herein, any number of action times 222, 224, 226, 228, 230, 232 may be included in the backhaul network handover response messages, according to various example embodiments.

In an example embodiment, the backhaul network handover response messages may include the following fields or information elements:

| IE | M/O | Notes |
| --- | --- | --- |
| Failure Indication | O | |
| HO Type | M | |
| MS Info | M | |
| >SF Info (one or more) | O | It may be included if a) Target ASN suggests per SF QoS parameters different from those the Serving ASN has sent in HO_Req or b) the Target ASN needs to deliver per-SF Data Path Info. |
| >>SFID | M | |
| >> Reservation Result | M | |
| BS Info (Serving) | M | It may be included in order to facilitate message delivery in the presence of HO Relay. |
| > Serving/Target Indicator | M | Set to Serving. |
| >BS ID | M | |
| BS Info (Target, one or more) | M | Note 1. |
| > Serving/Target Indicator | M | Set to Target. |
| >BS ID | M | |
| >BS HO RSP Code | O | 0: VOID<br>1: Target BS doesn't support this HO Type;<br>2: Target BS rejects for other reasons;<br>3: Target BS's CPU overload;<br>4: Target BS rejects for other reasons;<br>5-255: Reserved.<br>This TLV shall be mandatory if multiple target BS Info TLVs are present and if one of the Target BS handover transaction.<br>If only one Target BS was included in the corresponding HO_Req, the failure shall be indicated in the Failure Indication TLV instead of this TLV and this TLV shall be omitted. |
| >HO ID | O | May be included if Optional HO ID is assigned to the MS for use in initial ranging to the Target BS (within the Target ASN) during HO.<br>If included, its value has to be delivered to the MS with MOB_BSHO-REQ or MOB_BSHO-RSP. |
| >Service Level Prediction | O | If not included it defaults to 3 (No Service Level Prediction Available) in the Serving ASN.<br>The value may be delivered to the MS with MOB_BSHO-REQ or MOB_BSHO-RSP. |
| >HO Process Optimization | O | If not included defaults to 0b11111111 (Full Optimization).<br>The value may be delivered to the MS with MOB_BSHO-REQ or MOB_BSHO-RSP. |
| > HO Authorization Policy Support | O | The value may be delivered to the MS with MOB_BSHO-RSP. |
| >Action Time (one or more) | O | If not included defaults to the airframe in which the response is sent plus 10 airframe durations (50 ms).<br>The value may be delivered to the MS with MOB_BSHO-REQ or MOB_BSHO-RSP. This value is defined in absolute number of airframes. |
| > Time Stamp | O | HO Response transmission time from the TBS.<br>May be included in order to allow the Serving ASN to estimate the message propagation delay. |
| > Spare Capacity Indicator | O | May be included if the Target ASN reports to the Serving ASN how many MSs with the same PHY Quality Info and the same QoS Parameters might be accommodated in the Target ASN. |
| >SF Info (one or more) | O | If only one target BS, SF Info could be described by the sub TLV of MS Info; If there are more than one Target BS (e.g., Profile B), SF Info shall be described by the sub TLV of BS Info. |
| >>SFID | M | |
| >> Reservation Result | M | |
| Result Code | O | Provide result status for this message. If the result status is any value other than 0, then this TLV shall be included. (Note 1). |

The serving base station 106 may receive the backhaul network handover response messages 206A, 206B, 206C from some or all of the target base stations 108, 110, 112. The serving base station 106 may determine whether each of the target base stations 108, 110, 112 is capable of providing the fast ranging opportunity to the mobile station 104, and, for each of the target base stations 108, 110, 112 which is capable of providing the fast ranging opportunity to the mobile station 104, the serving base station 106 may determine the action time after which the target base station 108, 110, 112 can send the uplink map to the mobile station 104. The serving base station 106 may determine whether the target base stations 108, 110, 112 are capable of providing the fast ranging opportunity and/or the action time based on the received backhaul network handover response messages 206A, 206B, 206C.

In an example in which one or more of the backhaul network handover response messages 206A, 206B, 206C include two or more action times 222, 224, 226, 228, 230, 232, the serving base station 106 may select one or more action times 222, 224, 226, 228, 230, 232 per target base station from the action times 222, 224, 226, 228, 230, 232 included in the backhaul network handover response messages 206A, 206B, 206C. The serving base station 106 may, for example, select one action time 222, 224, 226, 228, 230, 232 per target base station 108, 110, 112 from the action times included in the backhaul network handover response messages 206A, 206B, 206C. In an example embodiment, the serving base station 106 may select, for each target base station, the lowest action time 222, 224, 226, 228, 230, 232 included in the backhaul network handover response message by that target base station 108, 110, 112. Thus, in the example shown in FIG. 2A, the serving base station 106 may select action time 222 for target base station 108, may select action time 226 for target base station 110, and may select action time 230 for target base station 112.

In an example embodiment, the serving base station 106 may select a generic action time from all of the action times 222, 224, 226, 228, 230, 232 included in the backhaul network handover response messages 206A, 206B, 206C. The serving base station 106 may select the generic action time in embodiments in which each backhaul network handover response message 206A, 206B, 206C includes a single action time 222, 224, 226, 228, 230, 232, as well as in embodiments in which one or more, or all of the backhaul network handover response messages 206A, 206B, 206C include more than one action time 222, 224, 226, 228, 230, 232. In an example embodiment, the serving base station 106 may select as the generic action time the lowest action time 222, 224, 226, 228, 230, 232 received from the target base stations 108, 110, 112 in the backhaul network handover response messages 206A, 206B, 206C.

In an example embodiment, the serving base station 106 may not receive all of the backhaul network handover response messages 206A, 206B, 206C at the same time. In an example embodiment, the serving base station 106 may determine whether to wait to receive backhaul network handover response messages 206A, 206B, 206C from any or all of the target base stations 108, 110, 112 from which the backhaul network handover response messages 206A, 206B, 206C have not been received, or to send a handover message (such as a handover response message or a handover request message) to the mobile station 104 without receiving backhaul network handover response messages 206A, 206B, 206C from all of the target base stations 108, 110, 112 to which backhaul network handover request messages 204A, 204B, 204C were sent. If the serving base station 106 determines to send the handover message without receiving backhaul network handover response messages 206A, 206B, 206C from all of the target base stations 108, 110, 112, the serving base station 106 may assume that the target base station(s) 108, 110, 112 from which backhaul network handover response message(s) 106A, 206B, 206C were not received are not capable of providing a fast ranging opportunity to the mobile station 104.

The determination of whether the wait for the remaining target base station(s) 108, 110, 112 to send its respective backhaul network handover response message 206A, 206B, 206C may be based on the action time indicated by one, at least one, some, or all of the target base station(s) 108, 110, 112 from which the backhaul network handover response message(s) 206A, 206B, 206C were received. The serving base station 106 may determine whether to wait for the remaining target base station(s) 108, 110, 112 based on policy such as whether waiting would still allow the mobile station 104 to receive the uplink map, or whether waiting would cause the mobile station 104 to miss the indicated action time during which the uplink map would be sent. For example, if the indicated action time is a long time away, then the serving base station 106 may wait to receive the unreceived backhaul network handover response message(s) 206A, 206B, 206C, but if the indicated action time is a short time away, then the serving base station 106 may not wait to receive the unreceived backhaul network handover response message(s) 206A, 206B, 206C. Or, the time which the serving base station 106 will wait may be based on one or more of the indicated action times, such as the shortest action time. The serving base station 106 may, for example, wait the maximum possible time to receive backhaul network handover response messages 206A, 206B, 206C while still allowing the target base station(s) to provide the fast ranging opportunity to the mobile station 104.

The serving base station 106 may send a handover message 208 to the mobile station 104. In an example in which the mobile station 104 initiated the handover process by sending the handover request 202 to the serving base station 106, the handover message 208 may include a handover response message. In an example in which the serving base station 106 initiates the handover process, and the mobile station 104 has not sent the handover request 202 to the serving base station 106, the handover message 208 may include a handover request message.

The handover message 208 may indicate whether each of the plurality of target base stations 108, 110, 112 is capable of providing the fast ranging opportunity for the mobile station 104. The handover message 208 may also indicate, for each of the target base stations 108, 110, 112 which is capable of providing the fast ranging opportunity, the action time after which the respective target base station 108, 110, 112 can send the uplink map to the mobile station 104. In an example in which one or more of the backhaul network handover response messages 206A, 206B, 206C indicated that the respective target base station 108, 110, 112 has more than one available action time, the handover message 208 may indicate each of the action times or a subset of the action times for the respective target base station 108, 110, 112. The handover message 208 may, for example, include the action times 222, 224, 226, 228, 230, 232 selected by the serving base station 106 from among the action times 222, 224, 226, 228, 230, 232 included in the backhaul network handover response messages 206A, 206B, 206C. The serving base station 106 may, for example, have selected one, or one or more, action times 222, 224, 226, 228, 230, 232 per target base station 108, 110, 112. The handover message 208 may also include the generic action time selected by the serving base station 106. In example embodiments, the action time may be pre-negotiated, hard-coded, and/or randomly determined.

In an example embodiment, the handover message 208 may indicate whether each of the target base stations 108, 110, 112 is capable of providing a fast ranging opportunity to the mobile station 104 by including a zero (0) in an action time field to indicate that the respective target base station 108, 110, 112 is not capable of providing the fast ranging opportunity, or by including a non-zero value in the action time field to indicate that the respective target base station 108, 110, 112 is capable of providing the fast ranging opportunity. The non-zero value in the action time field may also indicate the action time after which the target base station 108, 110, 112 can send the uplink map to the mobile station 104. Thus, in this example, the handover message 208 may include an action time field for each of the target base stations 108, 110, 112. The handover message 208 may also include a target base station identifier field identifying the respective target base station 108, 110, 112. The action time fields may be associated with their respective target base station identifier fields according to predetermined protocols, such as the target base station identifier field immediately preceding the action time field with which the target base station identifier field is associated, or the target base station identifier fields being in a same order within the handover message 208 as their respective action time fields. The action time fields may serve two purposes: to indicate whether the target base station 108, 110, 112 can provide the fast ranging opportunity (by including either a zero or non-zero value), and, if the target base station 108, 110, 112 can provide the fast ranging opportunity, to indicate the action time (or action times) 222, 224, 226, 228, 230, 232 after which the target base station 108, 110, 112 can send the uplink map to the mobile station 104.

In an example embodiment, the handover message 208 may include specific action times according to the target base stations 108, 110, 112 that the mobile station 104 has indicated interest in by including them in the handover request message to increase the likelihood of successful fast ranging at a target base station 108, 110, 112. In this case, the serving base station 106 may include the "Additional Action Time" TLV in the handover message 208 that the mobile station 104 may use in addition to the action time indicated in the handover message 208. If this TLV is not present in the message, then the single Action Time value may apply.

tion 106 may send the handover acknowledgments 210A, 210B, 210C individually in response to receiving their associated handover response messages 206A, 206B, 206C.

In an example in which the serving base station 106 selected a generic action time from the action times 222, 224, 226, 228, 230, 232 included in the backhaul network handover response messages 206A, 206B, 206C, the handover acknowledgment messages 210A, 210B, 210C may include the generic action time selected by the serving base station 106. In an example in which one or more of the backhaul network handover response messages 206A, 206B, 206C included more than one action time 222, 224, 226, 228, 230, 232, and the serving base station 106 selected one or more action times 222, 224, 226, 228, 230, 232 per target base station 108, 110, 112, the respective handover acknowledgments 210A, 210B, 212C may include, for the respective target base station 108, 110, 112 to which the handover acknowledgment 210A, 212B, 212C is sent, the action time 222, 224, 226, 228, 230, 232 selected by the serving base station 106. In various example embodiments, the handover acknowledgments 210A, 210B, 210C may also indicate a T55 parameter.

In an example embodiment, the handover acknowledgment messages 210A, 210B, 210C may include the following fields or information elements:

| IE | M/O | Notes |
| --- | --- | --- |
| Failure Indication | O | |
| BS Info (Target, one or more) | M | |
| > Serving/Target Indicator | M | Set to Target. |

| ype | Length | Value | Scope |
| --- | --- | --- | --- |
| | Variable; 8 x N_Recommended | for (i = 0, i < N_recommended, i++) { Action time (1 byte) } | MOB_BSHO-REQ, MOB_BSHO-RSP |

The order of Additional Action Time may match the order of Neighbor BSID (which may identify the target base station 108, 110, 112) listed in the message. A value of zero may indicate that no fast ranging is possible with the particular target base station 108, 110, 112.

If seamless handover is used, as described below with reference to FIGS. 3A and 3B, an additional action time value of zero may indicate that pre-allocated CIDs are already available at the particular target base station 108, 110, 112 and the mobile station 104 may initiate seamless handover at any time.

The serving base station 106 may also send a handover acknowledgment 210A, 210B, 210C to each of the target base stations 108, 110, 112 from which the serving base station 106 received handover response messages 206A, 206B, 206C. While FIG. 2A shows the serving base station 106 sending the handover acknowledgments 210A, 210B, 210C after sending the handover message 208, the serving base station 106 may send the handover acknowledgments 210A, 210B, 210C before, at the same time, or after sending the handover message 208, according to example embodiments. According to an example embodiment, the serving base sta- -continued

| IE | M/O | Notes |
| --- | --- | --- |
| >BS ID | M | |
| > Action Time Flag | O | 1 byte<br>#Bit0 set to "1": single action time is included in HO_Ack<br>#Bit1 set to "1": additional action time is included in HO_Ack<br>#Bit2-7: reserved |
| >Action Time (one or two) | O | Number of frames where the TBS allocates a dedicated transmission opportunity for Fast Ranging. This shall be present only during the 3-way HO_Req/HO_Rsp/HO_Ack transaction. It shall not be present in the 2-way HO_Cnf/HO_Ack & HO_Complete/HO_Ack transactions. If one action time is included, T-BS must refer to Action Time Flag to determine which action time is included, single action time or additional action time; If two action times are included, the first one denotes the single action time and the |

| IE | M/O | Notes |
|---|---|---|
| | | second one denotes the additional action time. |
| >T55 | O | 802.16 parameter |
| >Time Stamp | O | Transmission time for MOB_BSHO-REQ or MOB_BSHO-RSP over R1. May be included in order for the Target to estimate with greater accuracy when the fast ranging IE should be sent to the MS. This may be present only during the 3-way HO_Req/HO_Rsp/HO_Ack transaction. It shall not be present in the 2-way HO_Cnf/HO_Ack & HO_Complete/HO_Ack transactions. |

The mobile station 104 may receive the handover message 208. The mobile station 104 may select one of the target base stations 108, 110 112 to handover to based at least in part on information included in the handover message 208. The mobile station 104 may, for example, select the target base station 108, 110, 112 with the earliest available action time, may select the target base station 108, 110, 112 with an action time which most closely coincides with the time that the mobile station 104 desires to hand over, or may consider the respective action times along with other factors, such as the mobile station's 104 proximity to the respective target base station 108, 110, 112, the channel or signal quality of the mobile station 104 with the respective target base station 108, 110, 112, or other factors. The mobile station 104 may also select an action time 218 from among the action times 222, 224, 226, 228, 232 included in the handover message 208. For example, if the handover message 208 included more than one action time 222, 224, 226, 228, 230, 232 per target base station 108, 110, 112, the mobile station 104 may select both a target base station 108, 110, 112 to handover to, as well as an action time 218.

After selecting the target base station 108, 110, 112 to hand over to, the mobile station 104 may send a handover indication message 212 to the serving base station 106. The handover indication message 212 may indicate the selected target base station 108, 110, 112 to which the mobile station 104 will hand over. The handover indication message 212 may also include one of the action times 222, 224, 226, 228, 230, 232 included in the handover message 208. In response to receiving the handover indication message 212 from the mobile station 104, the serving base station 106 may send a handover confirmation message 214 to the selected target base station 108, 110, 112. In this example shown in FIG. 2A, the mobile station 104 has selected target base station 110, and the serving base station 106 has sent the handover confirmation 214 to the target base station 110.

In example embodiments, the serving base station 106 may send the handover confirmation message 214 to either the selected target base station 108, 110, 112, or to all the target base stations 108, 110, 112. The handover confirmation message 214 may indicate which target base station 108, 110, 112 was selected by the mobile station 104 and indicated in the handover indication message 212, and/or may indicate the selected action time 218 indicated by the handover indication message 212.

The selected target base station 110 may, in response to receiving the handover confirmation message 214, send an uplink map 216 to the mobile station 104 at the indicated action time 218. The uplink map 216 may indicate a dedicated time slot during which the mobile station 104 may send a fast ranging request 220. The mobile station 104 may, in response to receiving the uplink map 216, send the fast ranging request 220 during the dedicated time slot to the target base station 110. The mobile station 104 and the target base station 110 may thereafter wirelessly communicate via the air interface.

Figure 2B:
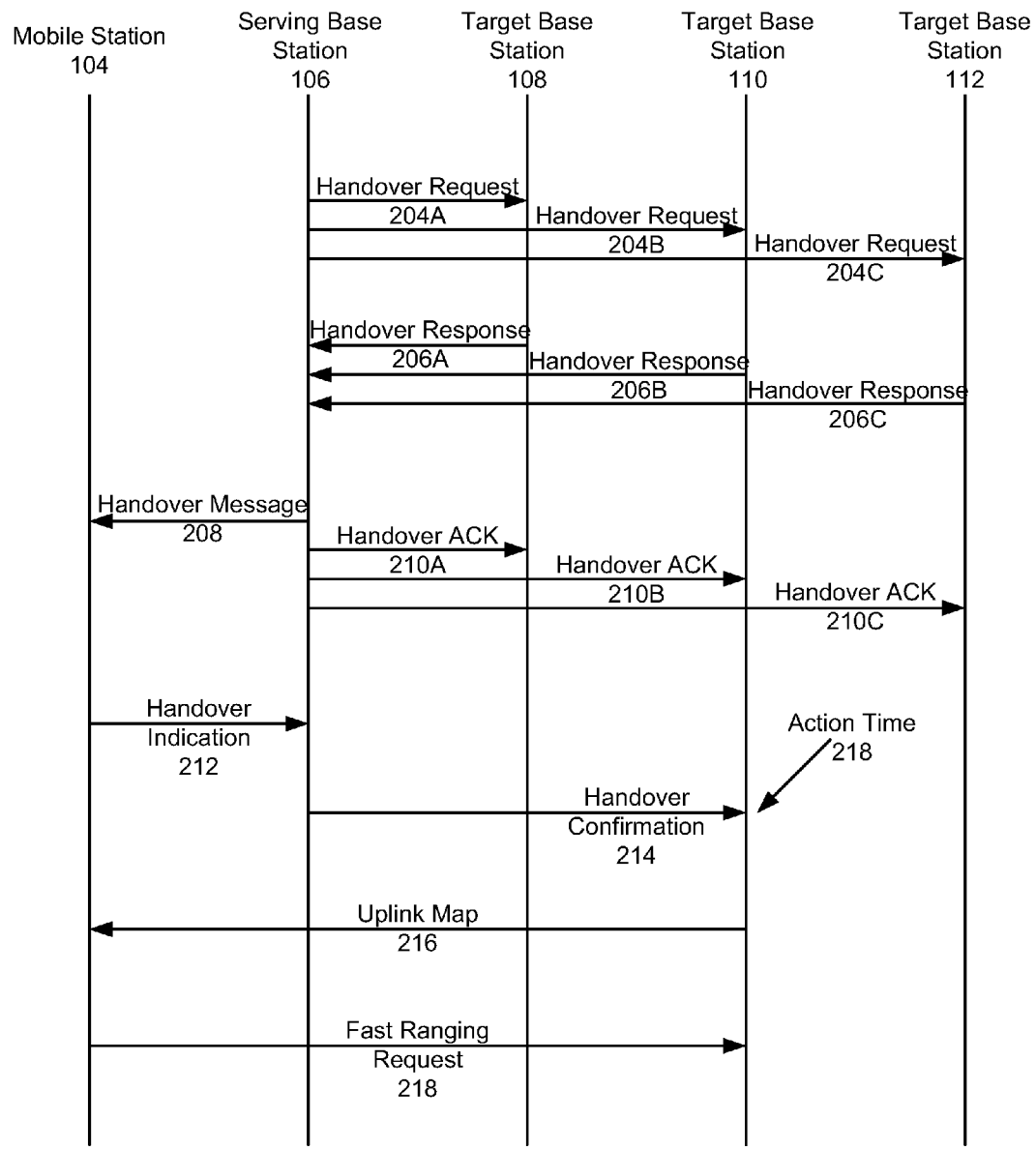
FIG. 2B is a vertical time-sequence diagram showing messages exchanged during a handover process initiated by a serving base station according to an example embodiment.

FIG. 2B is a vertical time-sequence diagram showing messages exchanged during a handover process initiated by the serving base station 106 according to an example embodiment. In this example, the serving base station 106 initiates the handover process based, for example, on determining the channel or signal quality with the mobile station 104 has fallen before a threshold level. The handover process in this example differs from that described with reference to FIG. 2A in that the mobile station 104 does not send a handover request message 202 to the serving base station 106. Instead, the serving base station 106 initiates the handover process by sending the backhaul network handover requests 204A, 204B, 204C to the target base stations 108, 110, 112, and the first communication between the mobile station 104 and the serving base station 106 is the handover message 208. In this example, the handover message 208 includes a handover request, and indicates whether each of the target base stations 108, 110, 112 is capable of providing the fast ranging opportunity and provides the action times, as described with reference to FIG. 2A.

Figure 2C:
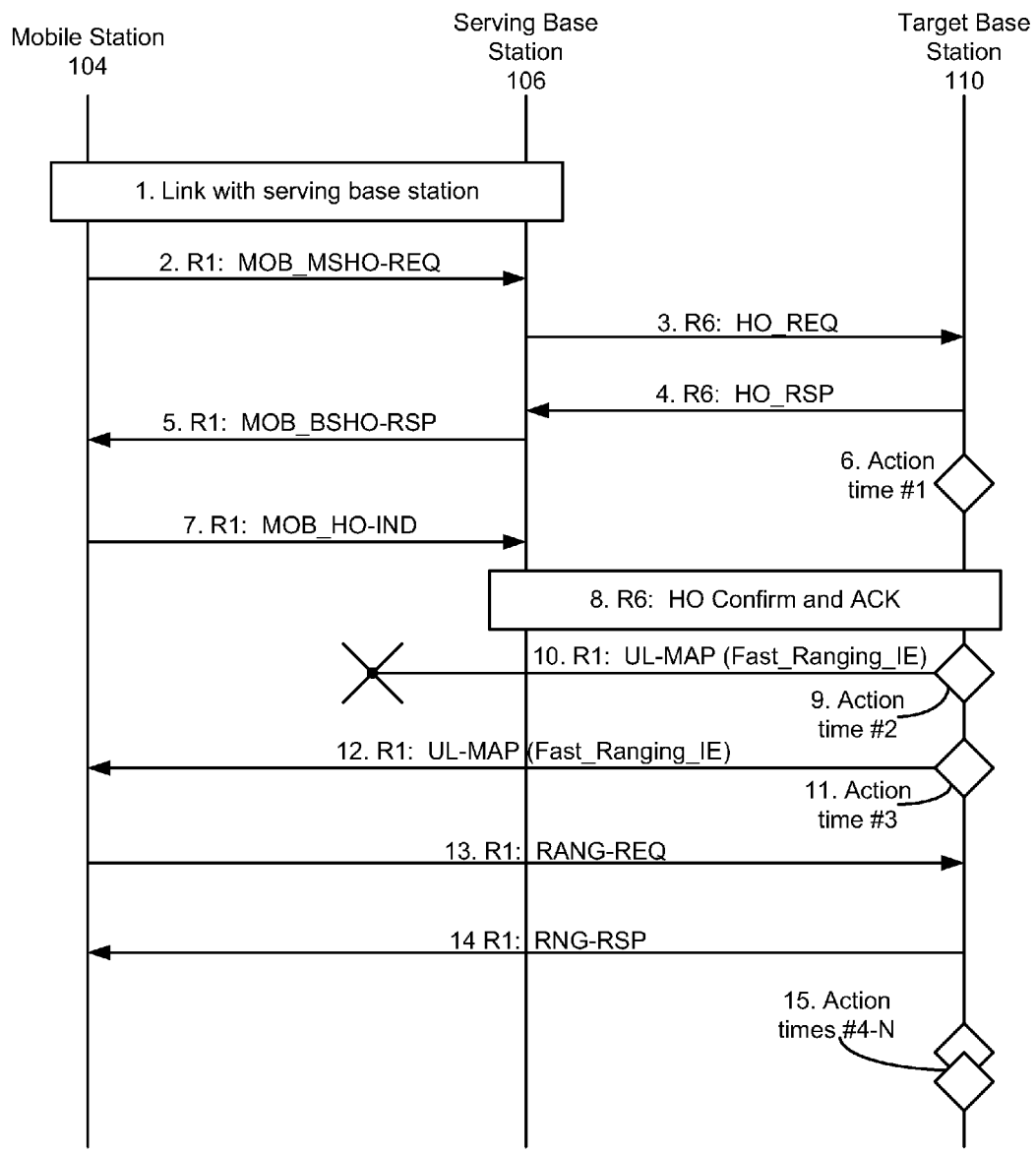
FIG. 2C is a vertical time-sequence diagram showing messages exchanged during a handover process initiated by the mobile station according to another example embodiment.

FIG. 2C is a vertical time-sequence diagram showing messages exchanged during a handover process initiated by the mobile station according to another example embodiment. At 1, a mobile station 104 may still be attached to a serving base station 106. Then the mobile station 104 may move and a handover of the mobile station 104 to a target base station 110 with adequate radio connection to the mobile station 104 may be performed.

At 2, the mobile station 104 may initiate handover (=HO) and signal a list of candidate target base stations T-BS1 . . . T-BSn and an indication that it can do/requests to do a fast handover procedure.

At 3, the serving base station 106 may signal the request to target base stations 108, 110, 112.

At 4, the target base stations 108, 110, 112 reply to the serving base station 106 and indicate a multitude of Action Times (e.g., #1, #2, #3, #4, . . . , N) at which times respectively a fast handover is possible.

At 5, the serving base station 106 collects and forwards the list of target base stations 108, 110, 112, each with the associated lists of Action Times.

At 6, action time #1 timer expires in a target base station 108, 110, 112. It timed out too early, i.e. before a HO confirm message has been received by the target base station 108, 110, 112. The target base station 108, 110, 112 does not allocate any fast ranging opportunity for the mobile station 104 at this action time #1.

At 7, a mobile station 104 may make a decision and signal an identity of the target base station 110 selected by the mobile station 104 to the serving base station 106.

At 8, the serving base station 106 may forward this decision in a signal to the selected target base station 110.

At 9, action time #2 timer expires in the target base station 108, 110, 112.

At 10, action time #2 expired too early for the mobile station 104 to receive the UL-MAP broadcast carrying the fast ranging opportunity. The mobile station 104 is not yet ready.

At 11, action time #3 expires in the target base station 108, 110, 112.

At 12, the target base station 110 allocated fast ranging opportunity to the mobile station 104 and broadcasts it in a UL-MAP message.

At 13, the mobile station 104 may send a ranging request in the allocated fast ranging (time) slot.

At 14, the target base station 104 may reply according to a predetermined protocol, such as the WiMax standard.

At 15, subsequent action time timers may expire in the target base station 108, 110, 112 but no fast ranging opportunity is allocated or broadcast since the target base station 108, 110, 112 is already aware of the mobile station 104 having used the opportunity #3.

Example embodiments described herein may allow for multiple action times for each target base station 108, 110, 112 in a fast handover procedure. These may be set to represent, e.g., fastest possible HO action time, expected fast HO action time, conservative HO action time (still faster than normal network re-entry).

A target base station 108, 110, 112 may send multiple action time opportunities for the mobile station 104 fast handover. They may be signalled via R4 and R6 interfaces in a HO_Rsp signal (TBD in NWG Rel1 Ver 1.2) from a target base station 108, 110, 112 to a serving base station 106.

Then they may be signalled via R1 e.g. in a MOB_BSHO-RSP or MOB_BSHO-REQ (TBD in 802.16e-Rev2) signal to the mobile station 104 for mobile- or network-triggered handover respectively.

Once a mobile station 104 used the first opportunity or obviously has ignored it by starting CDMA ranging (normal, slow HO), a target base station 108, 110, 112 may not give further fast ranging opportunities to that mobile station 104.

Alternative to listing action time instants, action times may be announced in bursts wherein only the first one and number of following ones are signalled.

An alternative to listing action times may be to employ a formula for distributing Action Time events after the first one, e.g., exponentially increasing inter-Action Time spacing.

Example embodiments cross a radio interface and could be standardized in IEEE 802.16e-Rev2 and/or in NWG Rel.1 CR.

Figure 3A:
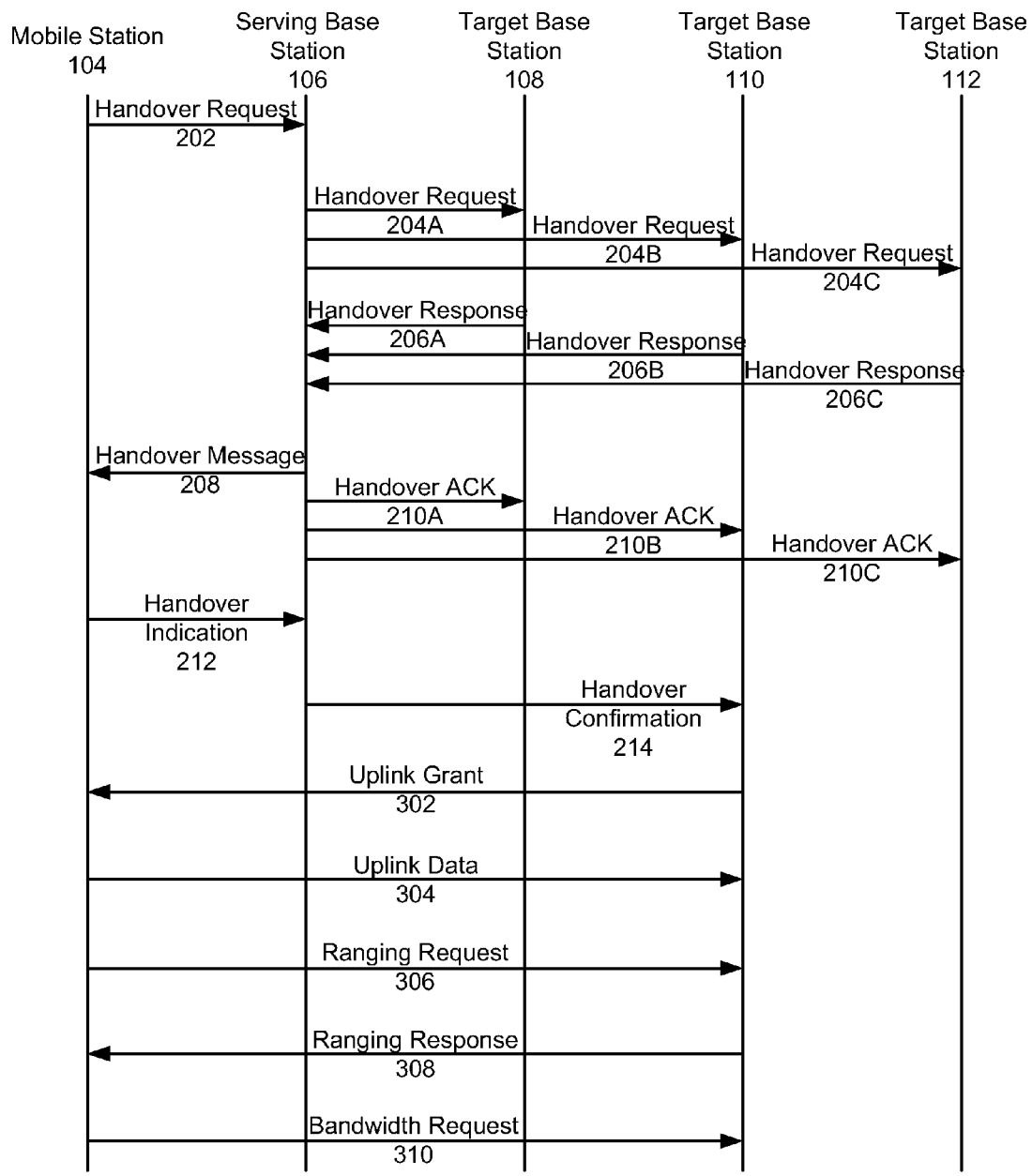
FIG. 3A is a vertical time-sequence diagram showing messages exchanged during a seamless handover process initiated by the mobile station according to an example embodiment.

FIG. 3A is a vertical time-sequence diagram showing messages exchanged during a seamless handover process initiated by the mobile station 104 according to an example embodiment. In this example, the handover request 202 and backhaul network handover requests 204A, 204B, 204C may be similar to those described with reference to FIG. 2A. However, in this example, the backhaul network handover response messages 206A, 206B, 206C may indicate whether seamless handover is enabled, such as by setting a seamless handover bit to 1. The backhaul network handover response messages 206A, 206B, 206C may also include action times for the respective serving base stations 108, 110, 112. However, in this example, the action times may indicate times at which pre-allocated connection identifiers (CIDs) may be valid for the mobile station 104, and at which time (or any time thereafter) the mobile station may perform a seamless handover using the pre-allocated CID with the respective target base station 108, 110, 112. The CID may allow the mobile station to send and/or receive unicast data to and/or from the respective target base station. In this example, a value of zero (0) for the action time may indicate that the pre-allocated CID is immediately available for seamless handover by the mobile station 104 with the respective target base station 108, 110, 112. Also in this example, a predetermined value for the action time, such as a maximum value, may indicate that that a pre-allocated CID is not available to enable a seamless handover with the particular target base station 108, 110, 112. In an example in which the action time is indicated by an eight-bit value, the action time (represented here in base-10) 255 may indicate that the pre-allocated CID is not available to enable a seamless handover with the particular target base station 108, 110, 112.

In this example, the serving base station 106 may receive the backhaul network handover response messages 206A, 206B, 206C. The serving base station 106 may, based on receiving the backhaul network handover response messages 206A, 206B, 206C, determine whether each of the target base stations 108, 110, 112 is capable of performing the seamless handover with the mobile station 104, and, for those target base stations which are capable of performing the seamless handover, determine an action time after which the pre-allocated CID will be available for the seamless handover. Based on this determination, the serving base station 106 may send a handover message 208 to the mobile station 104. The serving base station 106 may also determine whether to send the handover message 106 before receiving backhaul network handover response messages 206A, 206B, 206C or to wait to receive more or all of the backhaul network handover response messages 206A, 206B, 206C based on the action times, as described with reference to FIG. 2A.

The handover message 208 may indicate to the mobile station 104 which of the target base stations 108, 110, 112 are capable of performing the seamless handover with the mobile station 104 using pre-allocated CIDs, and, for those that are capable, an action time at which the pre-allocated CID(s) are available for the seamless handover. The handover message 208 may include action time fields indicating the action time for each of the target base stations 108, 110, 112, as described with reference to FIG. 2A. An action time of zero may indicate that the pre-allocated CID is immediately available for seamless handover with the respective target base station 108, 110, 112, whereas a predetermined value for the action time may indicate that the respective target base station 108, 110, 112 is not capable of seamless handover using the pre-allocated CID, as described with regard to the backhaul network handover responses 206A, 206B, 206C.

The serving base station 106 may send handover acknowledgments 210A, 210B, 210C to the target base stations 108, 110, 112 from which the serving base station 106 received backhaul network handover responses 206A, 206B, 206C, as described with reference to FIG. 2A. The mobile station 104 may receive the handover message 208, and may select one of the target base stations 108, 110, 112 to handover to, based at least in part on the availability of a CID for seamless handover, as well as other factors, as described with reference to FIG. 2A. The mobile station 104 may, based on selecting the target base station 108, 110, 112 to hand over to, send a handover indication message 212 to the serving base station 106, as described with reference to FIG. 2A. The serving base station 106 may receive the handover indication message 212, and may send a handover confirmation message 214 to the selected target base station 110, as described with reference to FIG. 2A.

In response to receiving the handover confirmation message 214, the selected target base station 110 may, at the action time (or later, if the selected target base station 110 did not receive the handover confirmation message 214 soon enough), send an uplink grant 302, and/or unicast encrypted downlink data, to the mobile station 104. The target base station 110 may send the uplink grant 302 and/or unicast encrypted downlink data to the mobile station 104 based on the pre-allocated CID. In response to receiving the uplink grant 302 and/or unicast encrypted downlink data, the mobile station 104 may send uplink data 304, which may be unicast and/or encrypted, and/or a bandwidth request, to the target base station, using the pre-allocated CID. The mobile station 104 may also send a fast ranging request 306 to the target base station 110 according to the uplink grant 302. The target base station 110 may, in response to receiving the fast ranging request 306, send a ranging response 308 to the mobile station 104. The mobile station 104 may respond to the ranging response 308 by sending a bandwidth request 310 to the target base station 110 requesting allocation of bandwidth, completing the seamless handover.

Figure 3B:
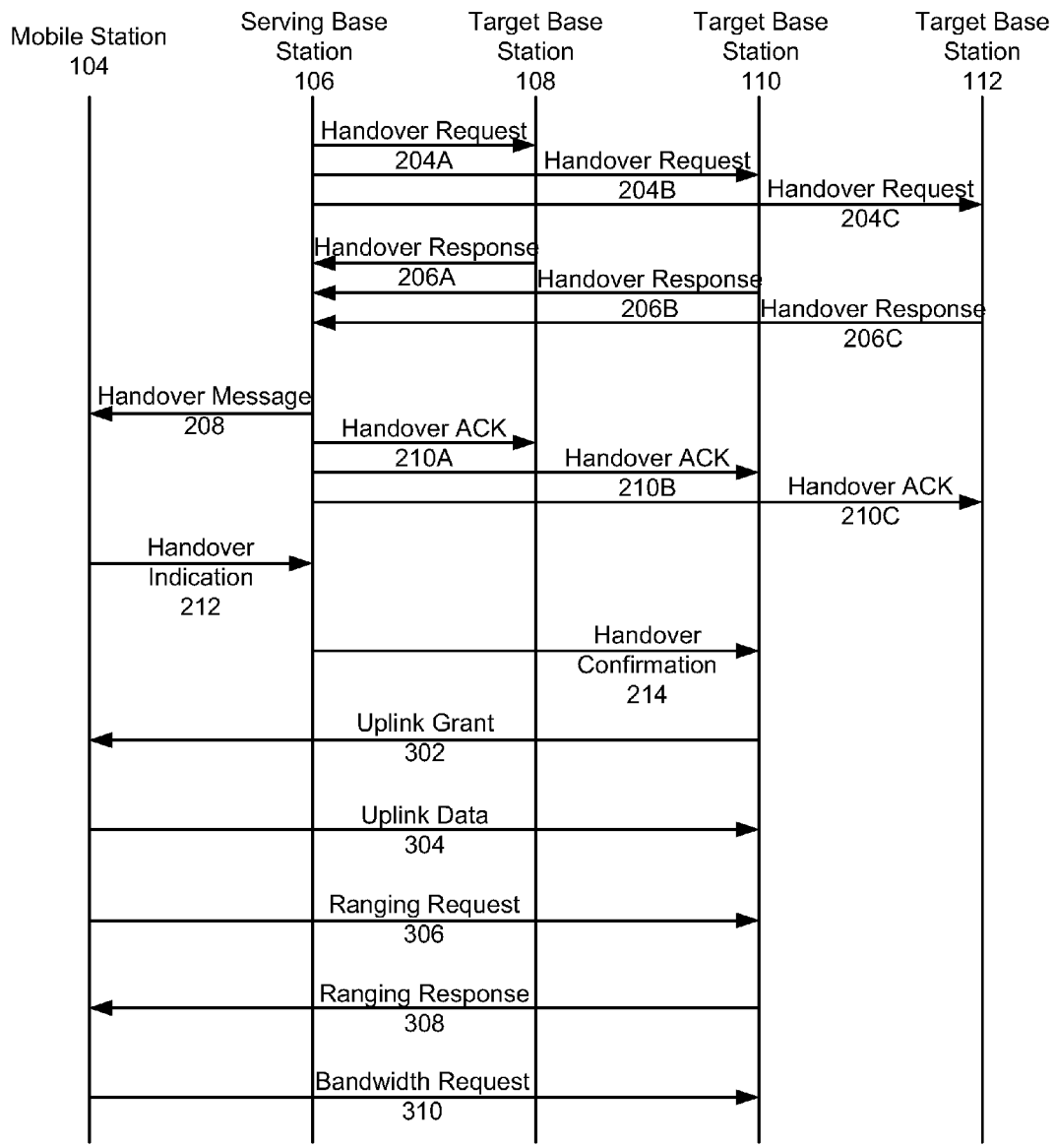
FIG. 3B is a vertical time-sequence diagram showing messages exchanged during a seamless handover process initiated by the serving base station according to an example embodiment.

FIG. 3B is a vertical time-sequence diagram showing messages exchanged during a seamless handover process initiated by the serving base station 106 according to an example embodiment. In this example, the serving base station 106 initiates the handover process based, for example, on determining that the channel or signal quality with the mobile station 104 has fallen below a threshold level. The handover process in this example differs from that described with reference to FIG. 3A in that the mobile station 104 does not send a handover request message 202 to the serving base station 106. Instead, the serving base station 106 initiates the handover process by sending the backhaul network handover requests 204A, 204B, 204C to the target base stations 108, 110, 112, and the first communication between the mobile station 104 and the serving base station 106 is the handover message 208. In this example, the handover message 208 includes a handover request, and indicates whether each of the target base stations 108, 110, 112 is capable of providing the fast ranging opportunity and provides the action times, as described with reference to FIG. 3A.

In some cases, not all mobile stations 104 will support handovers according to the processes described above. Thus, a legacy mobile station may not support the inclusion of multiple action times in a handover message 208, or even be aware of this feature. When such a legacy mobile station enters a network or cell that is using this feature, this may create problems in some cases, especially if the serving base station 106 does not know whether the mobile station 104 supports this feature. Thus, according to an example embodiment, as described below with reference to at least FIG. 4, a signaling or communication mechanism is provided that may allow a mobile station 104 to communicate to a serving base station 106 whether the mobile station 104 supports inclusion of multiple action times. Likewise, a signaling mechanism is provided that may allow the serving base station 106 to indicate to a mobile station 104 whether or not the serving base station 106 supports this feature. Based on this capability information received from the mobile station 104, the serving base station 106 may make a determination of whether to allow the mobile station 104 to join or enter the wireless network 102. And similarly, based on capability information received from the serving base station 106, the mobile station 104 may determine whether to join this wireless network 102 or cell, or another network or cell that does not support this feature.

Figure 4:
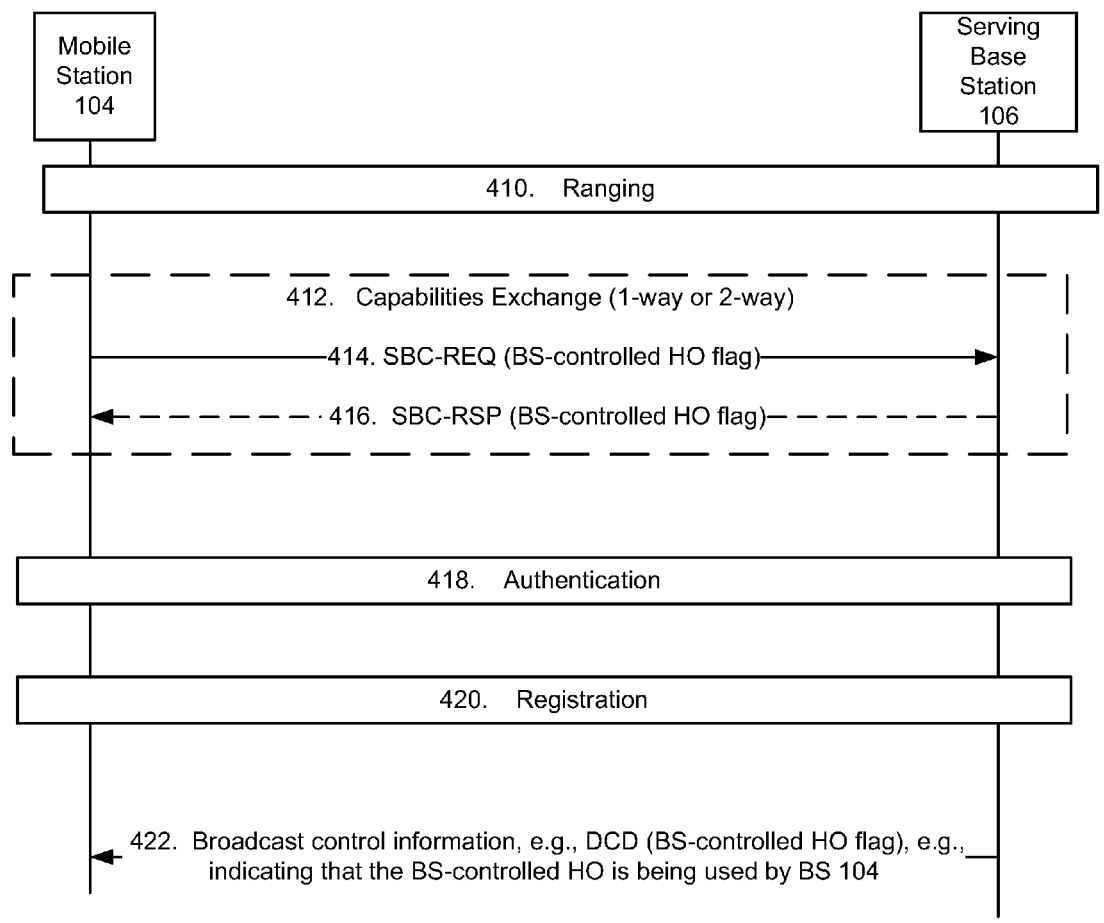
FIG. 4 is a vertical time-sequence diagram illustrating operation of signaling exchange regarding a base station controlled handover capability.

FIG. 4 is a vertical time-sequence diagram illustrating operation of signaling exchange regarding an inclusion of multiple action times in a handover message 208. Mobile station 104 may begin network entry for serving base station 106 by obtaining necessary uplink and downlink parameters including performing ranging between mobile station 104 and serving base station 106 at 410, capabilities exchange 412 between mobile station 104 and serving base station 106, authentication 418 between mobile station 104 and serving base station 106, and registration 420 between mobile station 104 and serving base station 106, as examples. Network entry may include other tasks or functions not shown.

The capabilities exchange 412 may include the mobile station 104 transmitting or providing a list of its capabilities to the serving base station 106, e.g., via a capability request message, such as an IEEE 802.16 subscriber station basic capability (SBC) request message (SBC-REQ), 414, or other message. The SBC-REQ message may include a multiple action time flag (e.g., within an extended capability field of SBC-REQ message 414) that indicates whether or not the mobile station 104 supports inclusion of multiple action times or action times within the handover message 208. For example, setting this multiple action times flag to 1 in the SBC-REQ message 414 may indicate that the mobile station 104 supports multiple action times, and clearing this bit to zero indicates that this feature is not supported by the mobile station 104. The lack of an explicit capability request message containing a multiple action times flag may indicate that this feature is not supported by the mobile station 104. Thus, according to an example embodiment, when mobile station 104 indicates that it supports this feature, and connects to a serving base station 106 that uses or implements this feature, the mobile station 104 may then initiate handover only according to a procedure that may include multiple action times within the handover message 208.

Similarly, although not required, the serving base station 106 may send the mobile station 104 a list of its capabilities, e.g., via a capability message, such as a subscriber station basic capability response (SBC-RSP) message 416. The SBC-RSP message 416 may include a multiple action time flag (e.g., within an extended capability field of SBC-RSP 416) that indicates whether or not the serving base station 106 supports multiple action times. For example, setting this flag to 1 in the SBC-RSP message 416 may indicate that the serving base station 106 supports this feature, and clearing this bit to zero indicates that this feature is not supported by the serving base station 106. Thus, according to one example embodiment, multiple action times may be implemented between a serving base station 106 and a mobile station 104 only if both serving base station 106 and mobile station 104 have indicated capability for such feature via capability messages or other messages exchanged between the serving base station 106 and mobile station 104. According to another example embodiment, multiple action time may also be implemented even if some mobile stations are not capable of supporting such feature.

The capabilities exchange 412 may include both messages 414 and 416 in one embodiment (2-way exchange, where both mobile station 104 and serving base station 106 indicate their ability to support multiple action times), or may just include SBC-REQ message 414 (e.g., 1-way communication indicating mobile station's 104 capability to support multiple action times). Thus, in one example embodiment, it may be optional, for example, whether the serving base station 106 sends the message indicating the serving base station's 106 support for this feature, e.g., via the SBC-RSP 416. Thus, SBC-RSP message 416 may be omitted, in an example embodiment. In this case, according to an example embodiment, the mobile station 104 may assume that the serving base station 106 supports multiple action times unless specifically informed otherwise (e.g., via the SBC-RSP message with multiple action times flag set to 0 indicating no support for this feature).

A serving base station 106 may, in some cases, transmit or broadcast a message(s) indicating which of its capabilities are being used or turned on. Some features may be indicated as in use simply via the capabilities exchange, while other capabilities may use an additional transmission of DCD or other message to indicate that such feature is actually in use by the serving base station 106. For example, serving base station 106 may transmit or broadcast a DCD (downlink channel descriptor) 422 (or other message) that includes a multiple action time field, e.g., set to 1, to indicate that the serving base station 106 is using (or enforcing or implementing) the multiple action time feature, or in other words, that this feature is turned on or in use by the serving base station 106. Since this DCD broadcast may occur at any time, e.g., before and/or after the ranging, capabilities exchange, authentication and registration, and may occur from time to time, the mobile station 104 may acquire the knowledge that the serving base station 106 is capable of supporting the multiple action time feature even before the capability exchange messages. However the lack of a multiple action time field in the broadcast message or the value set to 0 does not necessarily mean the serving base station 106 is not capable of supporting the multiple action time feature. While the DCD 422 may indicate use of the multiple action time, such a broadcast does not inform the serving base station 106 of whether or not the mobile station 104 actually supports multiple action times. Thus, the capabilities exchange, including a message (e.g., SBC-REQ 414) sent from the mobile station 104 may be used to inform the serving base station 106 of whether or not the mobile station 104 supports the multiple action times.

According to an example embodiment, based on the capabilities information provided by the mobile station 104 (e.g., via SBC-REQ message 414) indicating whether or not the mobile station 104 supports the multiple action times feature, the serving base station 106 may decide or determine whether or not to allow the mobile station 104 to continue with network entry, e.g., authentication, registration, etc. For example, the serving base station 106 may decide to reject the mobile station 104 (or prevent the mobile station 104 from completing network entry) if the serving base station 106 is requiring every mobile station 104 in its cell or network to comply with (or support) multiple action times. On the other hand, in the event that the mobile station 104 does not support multiple action times, the serving base station 106 may still decide to accept or allow the mobile station 104 to enter or join its cell or network, e.g., if the serving base station 106 is not currently using the multiple action times feature, or if the serving base station 106 has a light network load and adding a non-compliant mobile station will likely not create unacceptable network impact/delays.

For example, in response to receiving a message indicating that the mobile station 104 does not support multiple action times, the serving base station 106 may reject the mobile station 104 by the serving base station 106 transmitting to the mobile station 104 a rejection message, such as by sending a rejection message to the mobile station 104 that rejects one or more network entry related requests from the mobile station 104. The serving base station 106 may send a rejection message, such as, for example: a ranging response message indicating abort to the mobile station, which may cause the mobile station 104 to abort ranging or network entry; a ranging response message indicating downlink frequency overwrite or preamble index overwrite instructing the mobile station 104 to move to another serving base station 106; a registration response message rejecting a registration request from the mobile station 104; and an authentication response rejecting an authentication request from the mobile station 104, as some examples.

In addition, the serving base station 106 may send a message to the mobile station 104 indicating whether or not the serving base station 106 supports multiple action times, shown by way of example, as SBC-RSP message 416 in FIG. 4. Thus, during network entry, such as during a capabilities exchange with the serving base station 106, the mobile station 104 may determine that the serving base station 106 supports the multiple action times. In response to this message, the mobile station 104 may determine whether or not the mobile station 104 will continue with network entry with this base station 106, based at least in part on the indication from serving base station 106 of the base station's 106 support for the multiple action times feature, for example. Thus, if the serving base station 106 supports this feature, but the mobile station 104 does not, then the mobile station 104 may decide to discontinue (or abandon) further network entry procedures with this base station 106, and may attempt network entry with another base station 106, 108, 110, 112, e.g., that does not support this feature.

The tables shown below illustrate examples of the multiple action times field, which may be used by a mobile station 104 or serving base station 106 to indicate support for this feature.

Extended Capability: Additional Action Times

The extended capability field may specify the extended capability support for the specified features.

| Name | Type | Length | Value (variable-length) | Scope |
|---|---|---|---|---|
| Extended capability | 184 | 1 | Bit 0: This bit describes the capability to support ARQ Map Last Bit concept and the optimized Sequence Block as defined in Table 169. The feature is enabled only in case both mobile station and base station support it.<br>Bit 1: This bit describes the capability to support multiple action times If a mobile station supports this capability it shall set this bit to 1 and this TLV shall be transmitted; if the mobile station does not support the multiple action times capability it shall set to zero this bit in case this TLV is transmitted otherwise default value is "not support"; (same for base station - thus, this flag may be used by both mobile station and base station to indicate support or not for this feature). The feature is enabled only in case both mobile station and base station support it (in one example embodiment).<br>Bits 2-7: Reserved, set to zero. | SBC-RSP, SBC-REQ |

The following Handover Supported field may indicate what type(s) of handover the base station (BS) and the mobile station (MS) support. A bit value of 0 indicates "not supported," while 1 indicates it is supported.

| Type | Length | Value (variable-length) | Scope |
|---|---|---|---|
| 27 | 1 | Bit #0: MDHO/FBSS HO supported when it is set to 1. When this bit is set to 0, the BS shall ignore Bits#1-#4.<br>Bit #1: MDHO DL RF Combining supported with monitoring MAPs from active BSs when this bit is set to 1.<br>Bit #2: MDHO DL soft Combining supported with monitoring single MAP from anchor BS when this bit is set to 1.<br>Bit #3: MDHO DL soft combining supported with monitoring MAPs from active BSs when this bit is set to 1.<br>Bit #4: MDHO UL Multiple transmission is supported when this bit is set to 1.<br>Bit #5: Seamless HO is supported when this bit is set to 1. | REG-RSP REG-REQ |

| Type | Length | Value (variable-length) | Scope |
|------|--------|------------------------|-------|
| | | Bit #6: Additional action time is supported when this bit is set to 1. Bits #7: Reserved, shall be set to zero. | |

Figure 5:
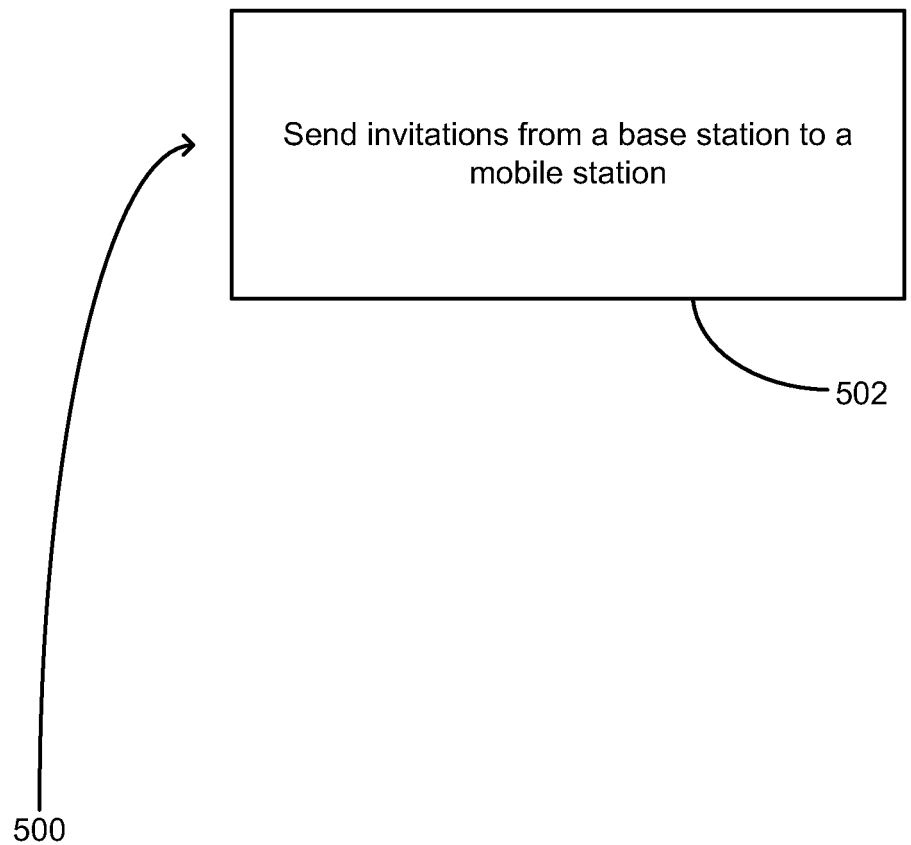
FIG. 5 is a flowchart showing a method performed by a serving base station according to an example embodiment.

FIG. 5 is a flowchart showing a method 500 performed by a serving base station according to an example embodiment. In this example, the method 500 may include sending invitations from a base station to a mobile station (502). The invitations may be invitations to send a request for a fast handover procedure from the mobile station to a base station.

Figure 6:
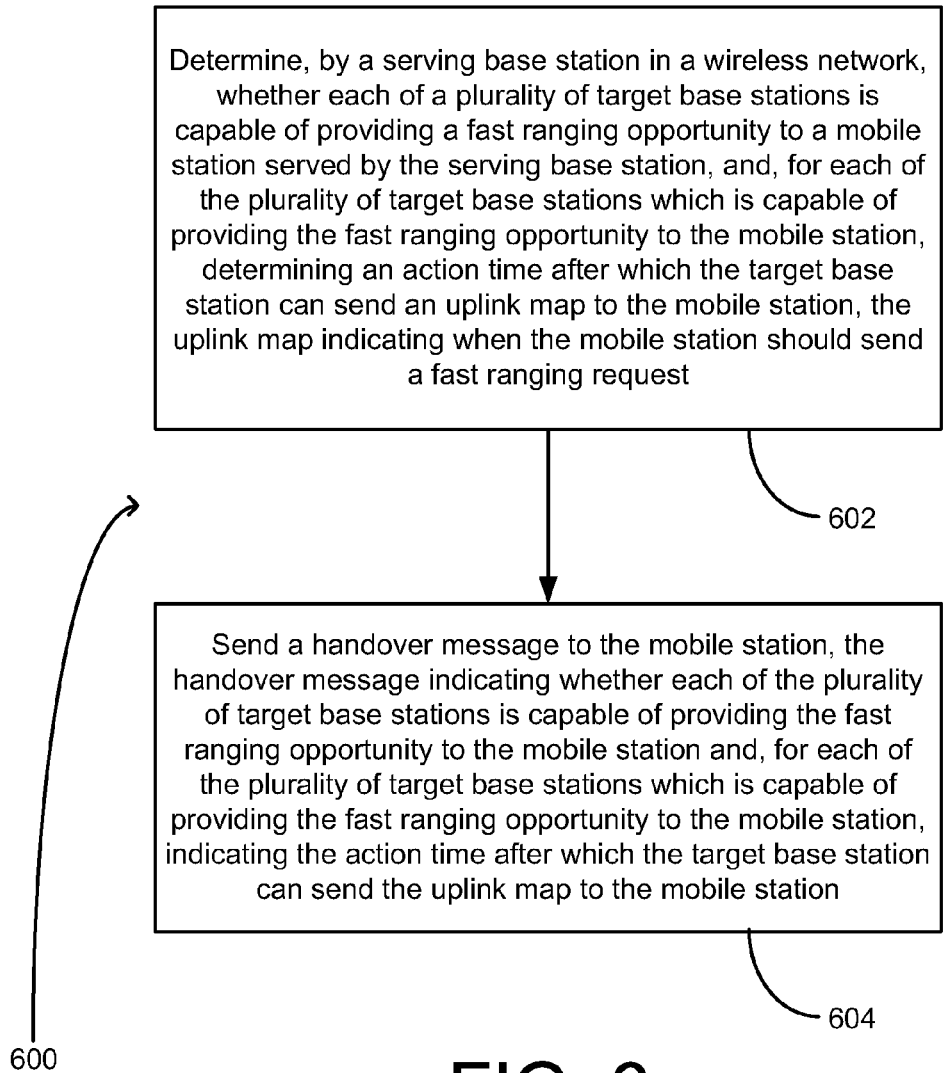
FIG. 6 is a flowchart showing a method performed by a serving base station according to an example embodiment.

FIG. 6 is a flowchart showing a method performed by a serving base station according to an example embodiment. In this example, the method 600 may include determining, by a serving base station in a wireless network, whether each of a plurality of target base stations is capable of providing a fast ranging opportunity to a mobile station served by the serving base station, and, for each of the plurality of target base stations which is capable of providing the fast ranging opportunity to the mobile station, determining an action time after which the target base station can send an uplink map to the mobile station, the uplink map indicating when the mobile station should send a fast ranging request (602). In this example, the method 600 may further include sending a handover message to the mobile station, the handover message indicating whether each of the plurality of target base stations is capable of providing the fast ranging opportunity to the mobile station and, for each of the plurality of target base stations which is capable of providing the fast ranging opportunity to the mobile station, indicating the action time after which the target base station can send the uplink map to the mobile station (604).

Figure 7:
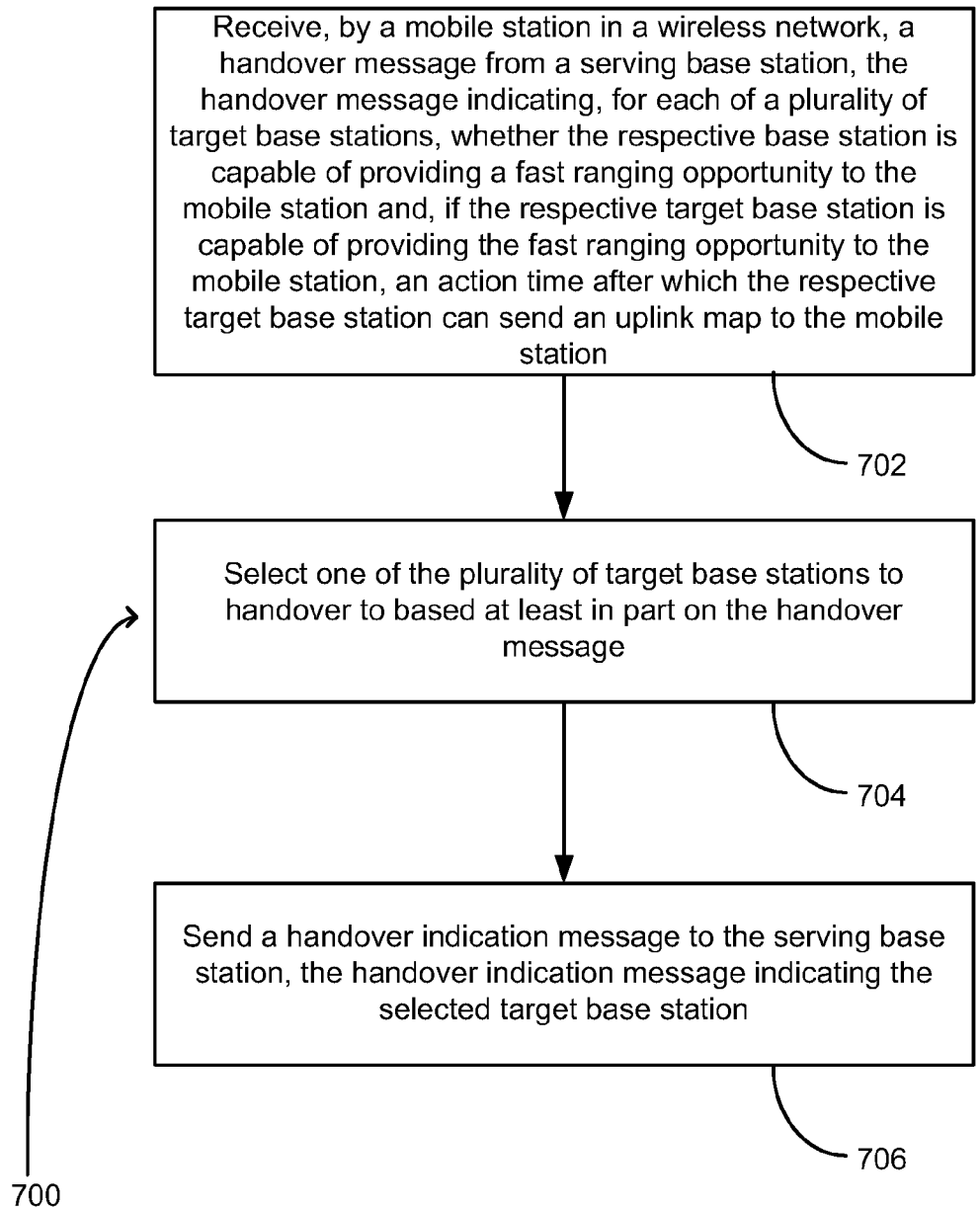
FIG. 7 is a flowchart showing a method performed by a mobile station according to an example embodiment.

FIG. 7 is a flowchart showing a method performed by a mobile station according to an example embodiment. In this example, the method 700 may include receiving, by a mobile station in a wireless network, a handover message from a serving base station, the handover message indicating, for each of a plurality of target base stations, whether the respective base station is capable of providing a fast ranging opportunity to the mobile station and, if the respective target base station is capable of providing the fast ranging opportunity to the mobile station, an action time after which the respective target base station can send an uplink map to the mobile station (702). The method 600 may also include selecting one of the plurality of target base stations to handover to based at least in part on the handover message (704). The method 700 may also include sending a handover indication message to the serving base station, the handover indication message indicating the selected target base station (706).

Figure 8:
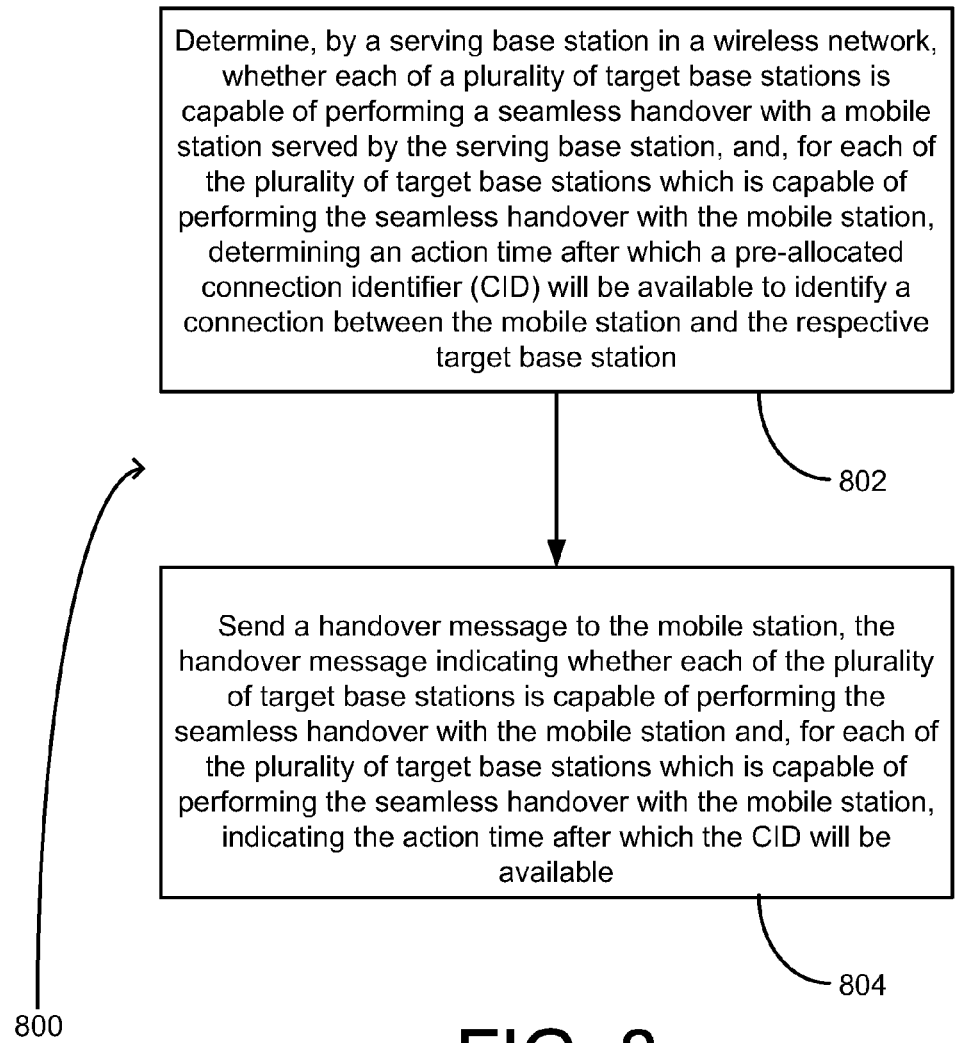
FIG. 8 is a flowchart showing a method performed by a serving base station according to another example embodiment.

FIG. 8 is a flowchart showing a method performed by a serving base station according to another example embodiment. In this example, the method 800 may include determining, by a serving base station in a wireless network, whether each of a plurality of target base stations is capable of performing a seamless handover with a mobile station served by the serving base station, and, for each of the plurality of target base stations which is capable of performing the seamless handover with the mobile station, determining an action time after which a pre-allocated connection identifier (CID) will be available to identify a connection between the mobile station and the respective target base station (802). The method 800 may also include sending a handover message to the mobile station, the handover message indicating whether each of the plurality of target base stations is capable of performing the seamless handover with the mobile station and, for each of the plurality of target base stations which is capable of performing the seamless handover with the mobile station, indicating the action time after which the CID will be available (804).

Figure 9:
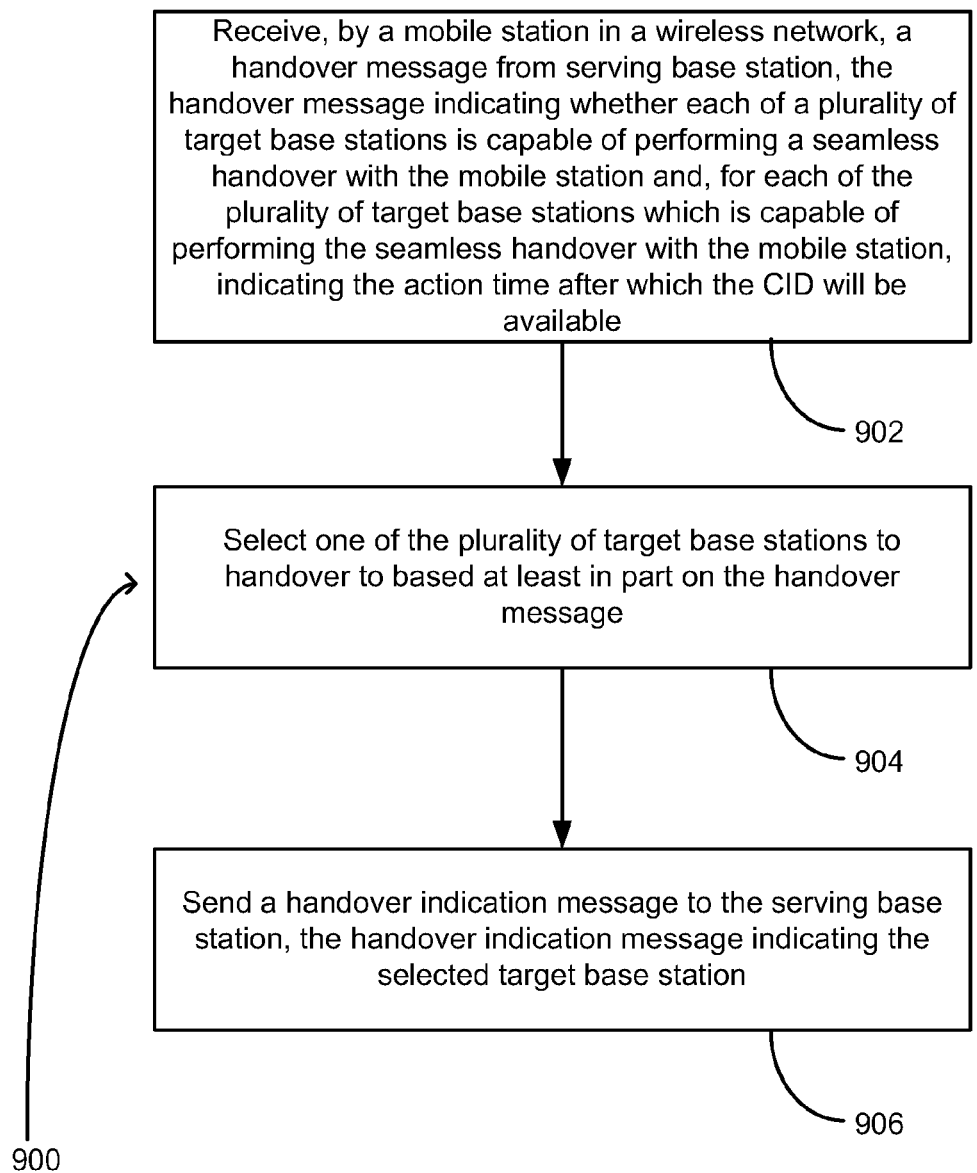
FIG. 9 is a flowchart showing a method performed by a mobile station according to another example embodiment.

FIG. 9 is a flowchart showing a method performed by a mobile station according to another example embodiment. In this example, the method 900 may include receiving, by a mobile station in a wireless network, a handover message from a serving base station, the handover message indicating whether each of a plurality of target base stations is capable of performing a seamless handover with the mobile station and, for each of the plurality of target base stations which is capable of performing the seamless handover with the mobile station, indicating the action time after which the CID will be available (902). The method 900 may also include selecting one of the plurality of target base stations to handover to based at least in part on the handover message (904). The method 900 may also include sending a handover indication message to the serving base station, the handover indication message indicating the selected target base station (906).

Figure 10:
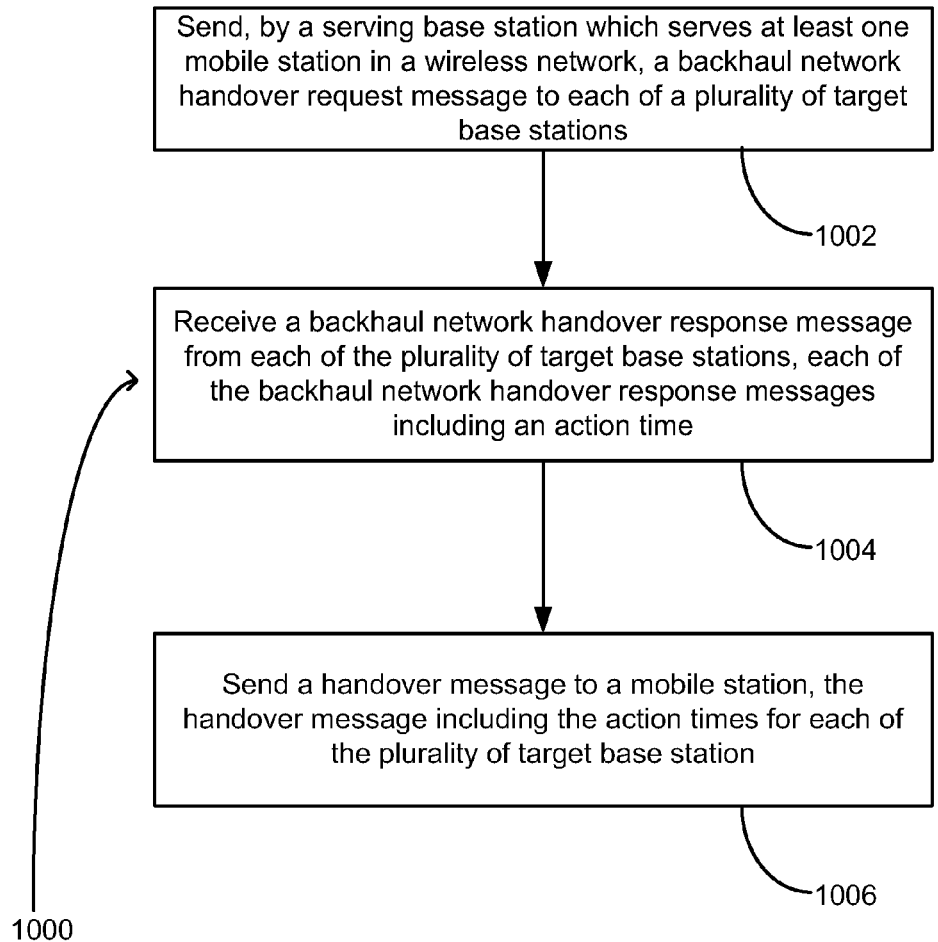
FIG. 10 is a flowchart showing a method performed by a serving base station according to another example embodiment.

FIG. 10 is a flowchart showing a method 1000 performed by a serving base station according to another example embodiment. In this example, the method 1000 may include sending, by a serving base station which serves at least one mobile station in a wireless network, a backhaul network handover request message to each of a plurality of target base stations (1002). The method 1000 may further include receiving a backhaul network handover response message from each of the plurality of target base stations, each of the backhaul network handover response messages including an action time (1004). The method 1000 may further include sending a handover message to a mobile station, the handover message including the action times for each of the plurality of target base stations (1006).

Figure 11:
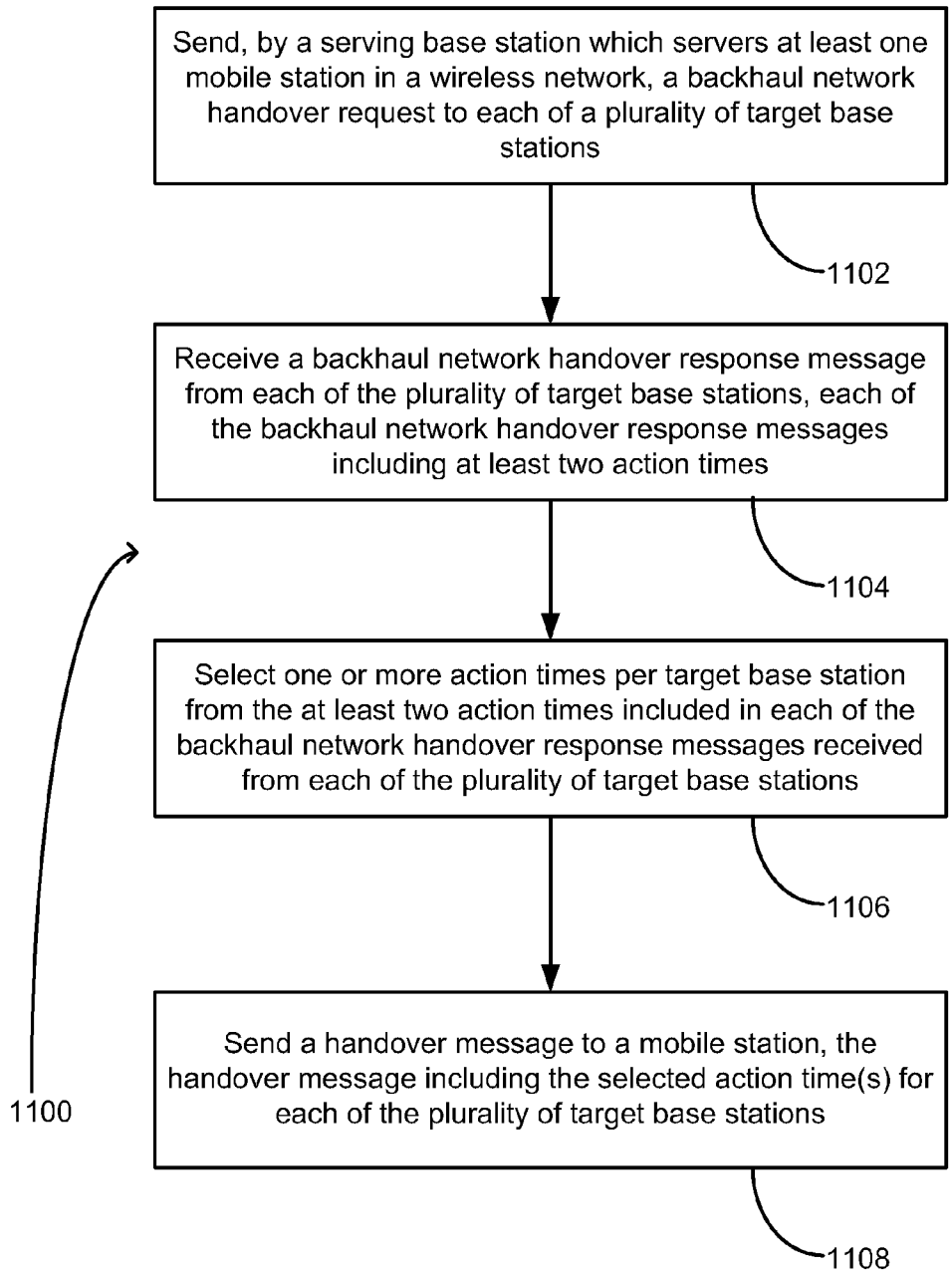
FIG. 11 is a flowchart showing a method performed by a serving base station according to another example embodiment.

FIG. 11 is a flowchart showing a method performed by a serving base station according to another example embodiment. In this example, the method 1100 may include sending, by a serving base station which serves at least one mobile station in a wireless network, a backhaul network handover request to each of a plurality of target base stations (1102). The method 1100 may further include receiving a backhaul network handover response message from each of the plurality of target base stations, each of the backhaul network handover response messages including at least two action times (1104). The method 1100 may further include selecting one or more action times per target base station from the at least two action times included in each of the backhaul network handover response messages received from each of the plurality of target base stations (1106). The method 1100 may also include sending a handover message to a mobile station, the handover message including the selected action time(s) for each of the plurality of target base stations (1108).

Figure 12:
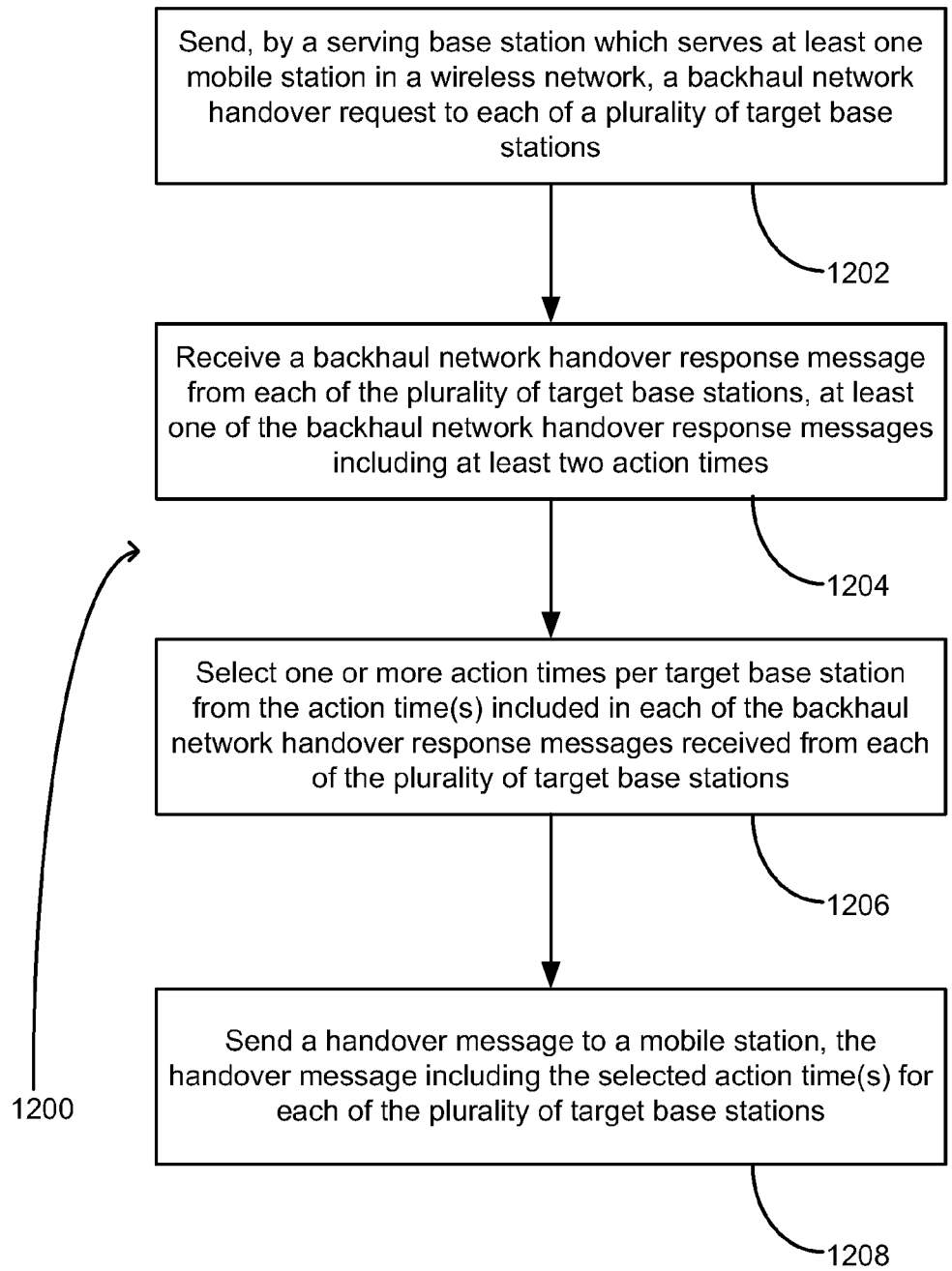
FIG. 12 is a flowchart showing a method performed by a serving base station according to another example embodiment.

FIG. 12 is a flowchart showing a method 1200 performed by a serving base station according to another example embodiment. According to this example, the method 1200 may include sending, by a serving base station which serves at least one mobile station in a wireless network, a backhaul network handover request to each of a plurality of target base stations (1202). The method 1200 may also include receiving a backhaul network handover response message from each of the plurality of target base stations, at least one of the backhaul network handover response messages including at least two action times (1204). The method 1200 may also include selecting one or more action times per target base station from the action time(s) included in each of the backhaul network handover response messages received from each of the plurality of target base stations (1206). The method 1200 may also include sending a handover message to a mobile station, the handover message including the selected action time(s) for each of the plurality of target base stations (1208).

Figure 13:
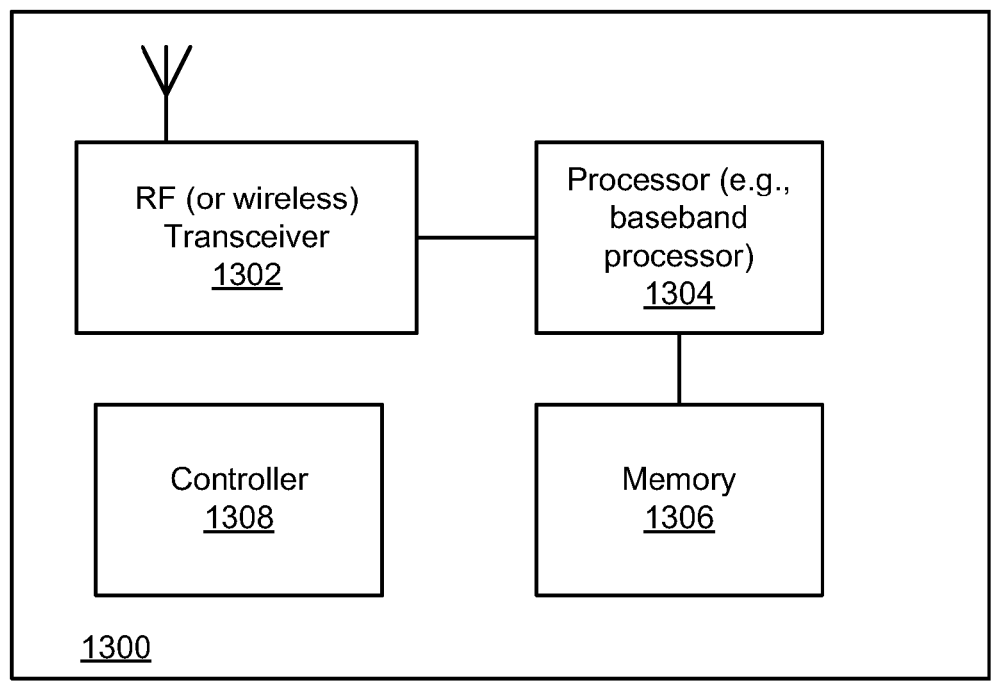
FIG. 13 is a block diagram of a wireless station according to an example embodiment.

FIG. 13 is a block diagram of a wireless station (or wireless node) 1300 according to an example embodiment. The wireless station 1300 (e.g., mobile station 104, serving base station 106, or target base station 108, 110, 112) may include, for example, an RF (radio frequency) or wireless transceiver 1302, including a transmitter to transmit signals and a receiver to receive signals, a processor 1304 to execute instructions or software and control transmission and receptions of signals, and a memory 1306 to store data and/or instructions.

Processor 1304 may also make decisions or determinations, generate frames or messages for transmission, decode received frames or messages for further processing, and other tasks or functions described herein. Processor 1304, which may be a baseband processor, for example, may generate messages, packets, frames or other signals (such as those described above) for transmission via wireless transceiver 1302. Processor 1304 may control transmission of signals or messages over a wireless network, and may receive signals or messages, etc., via a wireless network (e.g., after being downconverted by wireless transceiver 1302, for example). Processor 1304 may be programmable and capable of executing software or other instructions stored in memory or on other computer media to perform the various tasks and functions described above, such as one or more of the tasks or methods described above. Processor 904 may be (or may include), for example, hardware, programmable logic, a programmable processor that executes software or firmware, and/or any combination of these. Using other terminology, processor 904 and transceiver 902 together may be considered as a wireless transmitter/receiver system, for example.

In addition, referring to FIG. 13, a controller (or processor) 1308 may execute software and instructions, and may provide overall control for the station 1300, and may provide control for other systems not shown in FIG. 13, such as controlling input/output devices (e.g., display, keypad), and/or may execute software for one or more applications that may be provided on wireless station 1300, such as, for example, an email program, audio/video applications, a word processor, a Voice over IP application, or other application or software.

In addition, a storage medium such as the memory 1306 may be provided that includes stored instructions, which when executed by a controller or processor may result in the processor 1304, or other controller or processor, performing one or more of the functions or tasks described above.

Figure 14:
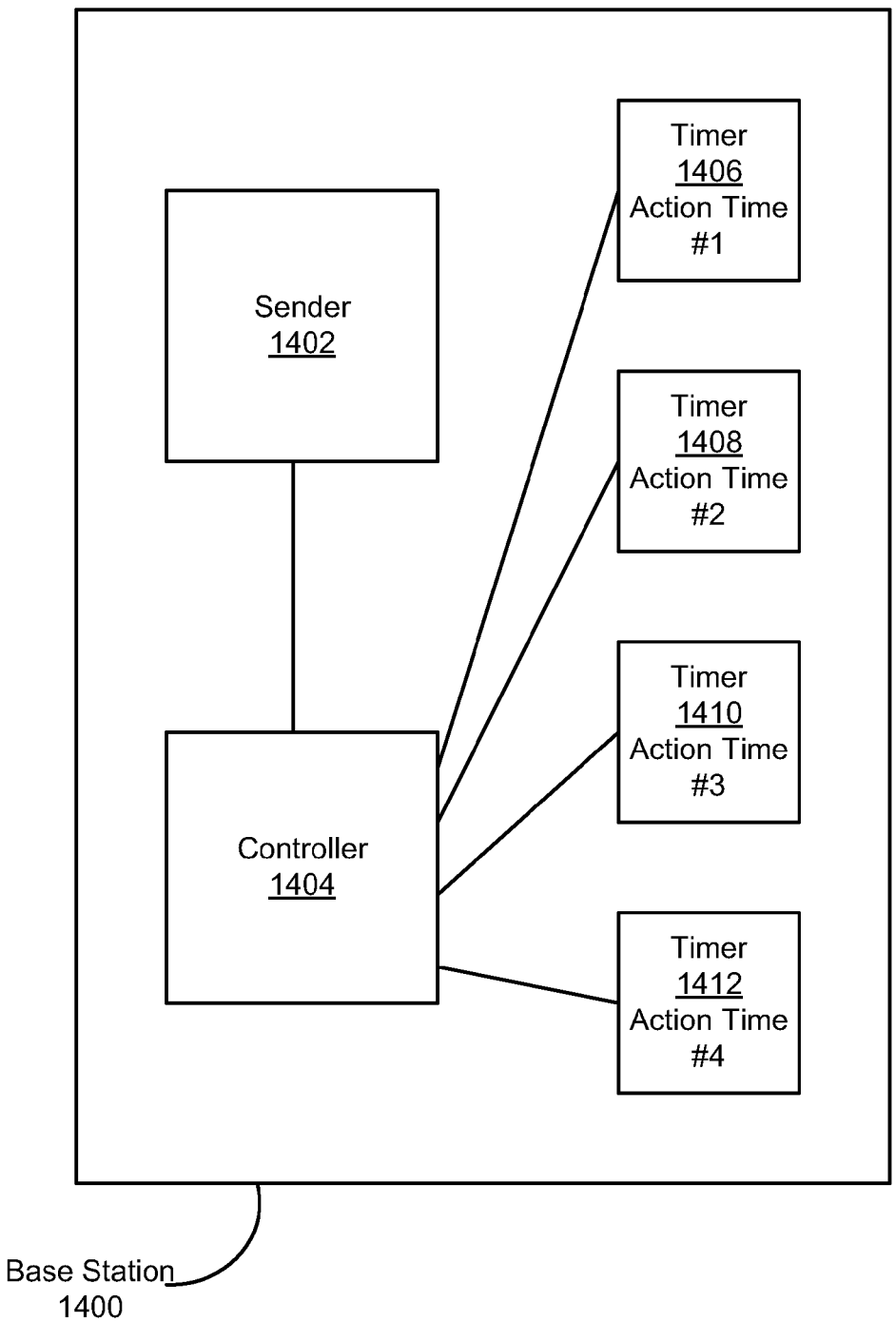
FIG. 14 is a block diagram of a base station according to an example embodiment.

FIG. 14 is a block diagram of a base station 1400 according to an example embodiment. In this example, the base station 1400 may include a sender 1402 controlled by a controller 1404 and with several timers 1406, 1408, 1410, 1412. When a timer 1406, 1408, 1410, 1412 times out, the controller 1404 may trigger the sender 1402 to send an invitation message (ranging opportunity), such as an uplink map, to the mobile station 104.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A method comprising:
    performing, by a serving base station with at least one mobile station served by the serving base station in a wireless network, capability negotiation to determine whether the at least one mobile station is capable of processing multiple action times;
    sending a backhaul network handover request message to each of a plurality of target base stations;
    receiving a backhaul network handover response message from each of the plurality of target base stations, each of the backhaul network handover response messages including an action time associated with the target base station from which the backhaul network handover response message is received; and
    sending a handover message to the at least one mobile station, the handover message including the action times associated with the plurality of target base stations,
    wherein at least one of the backhaul network handover response messages includes at least two action times associated with the target base station from which the backhaul network handover response message is received.

2. The method of claim 1, wherein:
    each of the backhaul network handover response messages includes at least two action times;
    the method further includes selecting one or more action times per target base station from the at least two action times included in each of the backhaul network handover response messages received from each of the plurality of target base stations; and
    the handover message includes the plurality of selected action times associated with the plurality of target base stations.

3. The method of claim 2, wherein the selecting one or more action times per target base station includes selecting one action time per target base station from the action time(s) included in each of the backhaul network handover response messages received from each of the plurality of target base stations.

4. The method of claim 1, further comprising:
    selecting, by the serving base station, a single action time from all of the action times received from the plurality of target base stations,
    wherein the sending the handover message to the at least one mobile station includes sending the handover message to the at least one mobile station, the handover message including the action times associated with the plurality of target base stations and the single action time.

5. The method of claim 1, wherein the sending the backhaul network handover request message includes sending the backhaul network handover request message, the backhaul network handover request message indicating that the at least one mobile station supports multiple action times.

6. The method of claim 1, wherein the receiving the backhaul network handover response message includes receiving the backhaul network handover response message from each of the plurality of target base stations, each of the backhaul network handover response messages including the action time associated with the target base station from which the backhaul network handover response message was received and indicating whether the target base station supports multiple action times.

7. The method of claim 4, further comprising sending, by the serving base station, a handover acknowledgment message to each of the target base stations, the handover acknowledgment message indicating the single action time.

8. The method of claim 1, further comprising sending, by the serving base station, a handover acknowledgment message to each of the target base stations, the handover acknowledgment messages each indicating a T55 parameter.

9. The method of claim 2, further comprising sending, by the serving base station, a handover acknowledgment message to each of the target base stations, each of the handover acknowledgment messages including, for the respective target base station, the action time(s) selected by the serving base station.

10. The method of claim 1, further comprising receiving a handover indication message from the at least one mobile station, the handover indication message indicating one of the action times included in the handover message.

11. The method of claim 10, further comprising sending a handover confirmation to at least one target base station, the handover confirmation including the action time indicated by the handover indication message received from the at least one mobile station.

12. The method of claim 1, further comprising:
    receiving a handover indication message from the at least one mobile station, the handover indication message indicating one of the target base stations to which the at least one mobile station will handover; and
    sending, by the serving base station, a handover confirmation message to the target base station indicated by the handover indication message.

13. The method of claim 1, further comprising:
    receiving a handover indication message from the at least one mobile station, the handover indication message indicating an action time and one of the target base stations to which the at least one mobile station will handover; and
    sending a handover confirmation message to the target base station indicated by the handover indication message, the handover confirmation message including the action time indicated by the handover indication message.

14. The method of claim 1, wherein the handover message sent to the at least one mobile station includes a handover request message.

15. The method of claim 1, further comprising:
    receiving a handover request message from the at least one mobile station,
    wherein the sending the handover message includes sending a handover response message to the at least one mobile station in response to receiving the handover request message from the at least one mobile station.

16. The method of claim 1, further comprising performing capability negotiation with the at least one mobile station to determine whether the at least one mobile station is capable of processing multiple action times, the capability negotiation including the serving base station sending a handover support field to the at least one mobile station indicating the capability of the serving base station to support multiple action times.

17. The method of claim 1, further comprising performing capability negotiation with the at least one mobile station to determine whether the at least one mobile station is capable of processing multiple action times, the capability negotiation including the serving base station receiving a handover support field from the at least one mobile station indicating the capability of the at least one mobile station to support multiple action times.

18. An apparatus comprising:
a processor, the processor being configured to:
perform capability negotiation with a mobile station to determine whether the mobile station is capable of processing multiple action times;
generate a backhaul network handover request message to send to each of a plurality of target base stations;
process a backhaul network handover response message received from each of the plurality of target base stations, each of the backhaul network handover response messages including an action time associated with the target base station from which the backhaul network handover response message is received; and
generate a handover message for the apparatus to send to the mobile station, the handover message including the action times associated with the plurality of target base stations,
wherein at least one of the backhaul network handover response messages includes at least two action times associated with the target base station from which the backhaul network handover response message is received.

19. The apparatus of claim 18, wherein the capability negotiation includes generating a handover support field to send to the mobile station indicating the capability of the processor to support multiple action times.

20. The apparatus of claim 18, wherein the capability negotiation includes processing a handover support field received from the mobile station indicating the capability of the mobile station to support multiple action times.

21. A computer program product for a serving base station in a wireless network, the computer program product being tangibly embodied on a computer storage medium and including executable code that, when executed, is configured to cause the serving base station to:
perform capability negotiation with a mobile station to determine whether the mobile station is capable of processing multiple action times;
send a backhaul network handover request message to each of a plurality of target base stations;
receive a backhaul network handover response message from each of the plurality of target base stations, each of the backhaul network handover response messages including an action time associated with the target base station from which the backhaul network handover response message is received; and
send a handover message to the mobile station, the handover message including the action times associated with the plurality of target base stations,
wherein at least one of the backhaul network handover response messages includes at least two action times associated with the target base station from which the backhaul network handover response message is received.

\* \* \* \* \*